(12) United States Patent
Yoshida

(10) Patent No.: US 7,980,951 B2
(45) Date of Patent: Jul. 19, 2011

(54) STORAGE MEDIUM HAVING GAME PROGRAM STORED THEREON AND GAME APPARATUS

(75) Inventor: Misuzu Yoshida, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1213 days.

(21) Appl. No.: 11/656,430

(22) Filed: Jan. 23, 2007

(65) Prior Publication Data

US 2008/0132338 A1    Jun. 5, 2008

(30) Foreign Application Priority Data

Dec. 1, 2006 (JP) ................................. 2006-326232

(51) Int. Cl.
*A63F 13/00* (2006.01)

(52) U.S. Cl. .............................. 463/36; 463/37; 463/39

(58) Field of Classification Search ................ 463/3, 36, 463/37, 39, 43, 47
See application file for complete search history.

(56) References Cited

U.S. PATENT DOCUMENTS

| 6,929,543 | B1 | 8/2005 | Ueshima et al. | |
|---|---|---|---|---|
| 7,445,550 | B2 * | 11/2008 | Barney et al. | 463/37 |
| 7,457,719 | B1 * | 11/2008 | Kahn et al. | 702/141 |
| 7,489,299 | B2 * | 2/2009 | Liberty et al. | 345/163 |
| 2003/0031062 | A1 | 2/2003 | Tsurugai et al. | |
| 2005/0119036 | A1 * | 6/2005 | Albanna et al. | 463/7 |
| 2006/0178212 | A1 | 8/2006 | Penzias | |
| 2006/0183546 | A1 * | 8/2006 | Addington et al. | 463/37 |
| 2007/0015559 | A1 * | 1/2007 | Zalewski et al. | 463/1 |
| 2007/0188323 | A1 * | 8/2007 | Sinclair et al. | 340/568.1 |

FOREIGN PATENT DOCUMENTS

| EP | 1 764 140 | 3/2007 |
|---|---|---|
| JP | 2000-308756 | 11/2000 |
| WO | WO 01/86920 | 11/2001 |

* cited by examiner

*Primary Examiner* — James S McClellan
(74) *Attorney, Agent, or Firm* — Nixon & Vanderhye, P.C.

(57) ABSTRACT

First acceleration data representing an acceleration applied in a first direction of the input device and second acceleration data representing an acceleration applied in a second direction of the input device different from the first direction are obtained based on a value detected by an acceleration detection section. Next, it is determined whether or not the first acceleration data is smaller than a first threshold value. When the first acceleration data is determined to be smaller than the first threshold value, predetermined calculation processing at least based on the second acceleration data is executed to calculate a first parameter used in game processing. When the first acceleration data is determined to be larger than the first threshold value, the first parameter is set to a predetermined value. The game processing is executed based on the first parameter.

28 Claims, 18 Drawing Sheets

STORAGE MEDIUM HAVING GAME PROGRAM STORED THEREON AND GAME APPARATUS

CROSS REFERENCE TO RELATED APPLICATION

The disclosure of Japanese Patent Application No. 2006-326232, filed on Dec. 1, 2006, is incorporated herein by reference.

FIELD

The technology herein relates to a storage medium having stored thereon a game program for a game apparatus for executing game processing of displaying an object in a game space as moving in accordance with a motion of an input device, and such a game apparatus, and more specifically to a storage medium having stored thereon a game program and a game apparatus for displaying an object as inclining in accordance with an inclining motion of the input device.

BACKGROUND AND SUMMARY

Conventionally, there are games in which a rod-like object such as a golf club, a baseball bat or the like is swung (a golf game or a baseball game). In such a game, a button using a switch or a lever is used as a controller for inputting a motion of swinging the rod-like object. Separately from such a game, a rod-shaped controller (input control device) is disclosed (for example, Japanese Laid-Open Patent Publication No. 2000-308756; hereinafter, referred to as "patent document 1"). The controller described in patent document 1 includes an acceleration sensor. A player holds the rod-shaped controller in his/her hand and actually performs a motion of swinging the controller. In the case of, for example, a three-dimensional game in which the player can experience a sword fighting action play, the player performs a motion of swinging the controller as if swinging a sword. Based on data which is output from the acceleration sensor, movement data of the sword in the game space is obtained, and a motion of a player object swinging the sword in accordance with the motion of the player is displayed as a game image.

However, the above-described input control device disclosed in patent document 1 has the following problem. When, for example, the player swings the rod-shaped controller vigorously, the detection speed of the acceleration sensor does not follow the moving speed of the controller. As a result, motion data representing a motion different from the motion provided by the operation of the player is occasionally obtained. The motion intended by the player is not displayed; i.e., a motion which is quite different from the motion of the controller provided by the operation of the player is displayed without reflecting the intention of the player. This makes the game less amusing.

Therefore, certain example embodiments provide a game program and a game apparatus for reflecting a motion intended by the player even when an input device is vigorously moved.

Certain example embodiments may have the following features to attain the object mentioned above. The reference numerals, additional explanations and the like in parentheses in this section of the specification indicate the correspondence with the embodiments described later for easier understanding of the present invention, and do not limit the present invention in any way.

Certain example embodiments are used for a game which causes the player to perform an operation of changing the inclination of an input device with respect to the gravity direction and executes game control in accordance with the inclination. Typically, it is instructed explicitly or inexplicitly by an operation manual or on the screen to perform such an operation, and the player follows such an instruction.

A first aspect of certain example embodiments is directed to a storage medium having stored thereon a game program executable by a computer of a game apparatus capable of using a value detected by an acceleration detection section provided in an input device for detecting an acceleration in at least two directions. The game program causes the computer to execute a first acceleration obtaining step (S2), a second acceleration obtaining step (S2), a first determination step (S6), a first parameter setting step (S14), and a game processing control step (S16). The first acceleration obtaining step (S2) obtains first acceleration data representing an acceleration in a first direction of the input device, based on a value detected by the acceleration detection section. The second acceleration obtaining step (S2) obtains second acceleration data representing an acceleration in a second direction of the input device which is different from the first direction, based on a value detected by the acceleration detection section. The first determination step (S6) determines whether or not the first acceleration data is smaller than a first threshold value. The first parameter setting step (S14), when the first acceleration data is determined to be smaller than the first threshold value in the first determination step, executes predetermined calculation processing at least based on the second acceleration data to execute first setting processing of calculating a first parameter used in game processing; and when the first acceleration data is determined to be larger than the first threshold value in the first determination step, executes second setting processing of setting the first parameter to a predetermined value. The game processing control step (S16) executes the game processing based on the first parameter which is set in the first parameter setting step.

The acceleration detection section detects an acceleration in at least two directions. The acceleration detection section is provided in the input device and thus detects an acceleration generated in at least two directions of the input device. The acceleration detection section may be capable of detecting an acceleration in three directions. The input device is typically formed such that the player can hold the input device with both hands or one hand. The acceleration detection section may include a single acceleration sensor or include a plurality of acceleration sensors. The first acceleration obtaining step obtains acceleration data representing an acceleration generated in one direction (first direction) of the input device, based on a value detected by the acceleration detection section. The second acceleration obtaining step obtains acceleration data representing an acceleration generated in another direction (second direction) of the input device, based on a value detected by the acceleration detection section. The first direction and the second direction may be the same, or different from, a direction in which the acceleration detection section detects the acceleration.

The first direction and the second direction may be perpendicular to each other. For example, each of the first direction and the second direction is typically one of the forward direction (positive z axis direction in FIG. 3 described later), the rearward direction (negative z axis direction in FIG. 3), the upward direction (positive y axis direction in FIG. 3), the downward direction (negative y axis direction in FIG. 3), the leftward direction (positive x axis direction in FIG. 3), and the rightward direction (negative x axis direction in FIG. 3). The first direction and the second direction may be one of the following combinations: (a) "the first direction is the forward or rearward direction, and the second direction is the upward or downward direction", (b) "the first direction is the upward or downward direction, and the second direction is the forward or rearward direction", (c) "the first direction is the leftward or rightward direction, and the second direction is the upward or downward direction", and (d) "the first direction is the upward or downward direction, and the second direction is the leftward or rightward direction". In a game in which the player holding the input device performs an inclination operation by moving one of the front end and the rear end upward and downward without moving the other end, the combination (a) is preferable. In a game in which the player holding the input device performs an inclination operation by moving one of the top end and the bottom end forward and rearward without moving the other end, the combination (b) is preferable. In a game in which the player holding the input device performs an inclination operation by moving one of the left end and the right end upward and downward without moving the other end, the combination (c) is preferable. In a game in which the player holding the input device performs an inclination operation by moving one of the top end and the bottom end leftward and rightward without moving the other end, the combination (d) is preferable. Owing to such setting, the first direction is a direction in which a centrifugal force acts when the player moves one end of the input device upward and downward, forward and rearward, or leftward and rightward without moving the other end. Thus, in the first determination step described later, the magnitude of the acceleration including the centrifugal force generated in the input device can be determined. The forward-rearward direction, the upward-downward direction, and leftward-rightward direction of the input device are three directions perpendicular to one another. Which directions are the forward-rearward direction, the upward-downward direction, and leftward-rightward direction is determined in a state where the player holds the input device at a reference posture. Usually, these directions are specified in accordance with the shape of the housing of the input device. One of the three directions can be specified as a longer direction of the input device, and the other two directions can be specified as shorter directions of the input device. Hereinafter, a simple expression "forward-rearward direction" refers to the forward-rearward direction of the input device. A simple expression "upward-downward direction" refers to the upward-downward direction of the input device. A simple expression "leftward-rightward direction" refers to the leftward-rightward direction of the input device.

When the input device is formed to have a lengthy shape, the longer direction may be the first direction and the shorter direction may be the second direction. The input device may be formed such that the input device extends in the longer direction and the input device is held by a hand which is in contact with the circumferential surface thereof around the axis extending in the longer direction. In this case, the longer direction may be the first direction and a direction perpendicular thereto may be the second direction. As described above, certain example embodiments are used for a game which causes the player to perform an operation of changing the inclination of the input device with respect to the gravity direction. More specifically, the player holds the input device such that the first direction and the second direction are both present in the vertical plane, and performs an operation of inclining the input device while keeping the state where the first direction and the second direction are both present in the vertical plane. Typically, it is instructed explicitly or inexplicitly to perform such an operation by an operation manual or on the screen, and the player follows such an instruction. The first determination step determines which of the acceleration generated in the first direction of the input device and a certain threshold value is larger, based on the first acceleration data obtained in the first acceleration obtaining step. When the player performs an operation of inclining the input device, one end of the input device moves on an arc around the other end as the center. Therefore, the acceleration detection section of the input device moves in an arc. As described above, the player holds the input device such that the first direction and the second direction are both in the vertical plane, and performs an operation of inclining the input device while keeping such a state. Therefore, in the first direction and the second direction, an acceleration by the movement on an arc (a centrifugal force acting in a direction which is perpendicular to the arc and is outward from the arc and an acceleration acting in a direction along the arc) is generated. When the input device is further inclined, the inclination of the first direction and the second direction with respect to the gravity direction changes, and therefore a first direction component and a second direction component of the gravitational acceleration change. Namely, by the operation of inclining the input device, the first acceleration data is changed by the "acceleration by the movement on an arc" and "the first direction component of the gravitational acceleration". The gravity component may be removed from the first acceleration data obtained in the first acceleration obtaining step, so that it is determined in the first determination step which of the first acceleration data after the gravity component is removed and the first threshold value is larger. (In the second determination step described later also, it may be determined which of the second acceleration data after the gravity component is removed and the second threshold value is larger.) When the gravity component is not removed from the first acceleration data, the determination may be performed in accordance with the maximum value of the first direction component of the gravitational acceleration. The maximum value is maximum when the first direction matches the gravity direction, and is the gravitational acceleration. When the range in which the input device can be inclined is limited, the maximum value is "the first direction component of the gravitational acceleration at a posture at which the first direction is closest to the gravity direction". (The limitation on the range in which the input device can be inclined is instructed explicitly or inexplicitly by an operation manual or on the screen, and the player follows such an instruction.) In a game in which the input device is inclined from the state where the first direction is the upward vertical direction to the state where the first direction is the horizontal direction, the first direction component of the gravitational acceleration has a value in the range of –G to 0. Therefore, the maximum value is 0. Hence, the first threshold value is set to a value larger than 0. In a game in which the input device is inclined from the state where the first direction is the downward vertical direction to the state where the first direction is the horizontal direction, the first direction component of the gravitational acceleration has a value in the range of 0 to G. Therefore, the maximum value is G. Hence, the first threshold value is set to a value larger than G. In a game in which the input device is inclined from the state where the first direction is the upward vertical direction to the state where the first direction is the downward vertical direction, the first direction component of the gravitational acceleration has a value in the range of –G to G. Therefore, the maximum value is G. Hence, the first threshold value is set to a value larger than G. Also in a game in which the input device is allowed to be inclined from a state where the first direction has a predetermined angle (e.g., 45 degrees or 30 degrees) with respect to the horizontal plane to a state where the first direction has another predetermined angle with respect to the horizontal plane, the first threshold value can be determined in a similar manner. When the first acceleration data is larger than the maximum value, this means that the first acceleration data includes at least an element of the "acceleration by the movement on an arc". The "threshold value" used in the first determination step is set to be a value larger than the maximum value (a value obtained by adding a certain determination value to the maximum value). Owing to this, in the first determination step, it is determined that the value of the "acceleration by the movement on an arc" included in the first acceleration data is at least larger than the certain determination value. The value of the "acceleration by the movement on an arc" increases in accordance with the level of vigor with which the player inclines the input device. Therefore, in the first determination step, it is determined whether or not the player performs the operation of inclining the input device with a certain level of vigor. At least when the first acceleration data is determined to be smaller than the threshold value in the first determination step, the first parameter setting step sets the first parameter based on at least the acceleration applied in the second direction (second acceleration data). When the first acceleration data is determined to be larger than the threshold value, the first parameter setting step sets the first parameter to a predetermine value. Owing to this, only when the player does not perform the operation of inclining the input device with a certain level of vigor, the first parameter is set based on the second acceleration data. Otherwise, the first parameter is set to a predetermined value. In the following description, the determination that the first acceleration data is smaller than the threshold value will be referred to as the "normal operation determination", and the determination that the first acceleration data is larger than the threshold value will be referred to as the "vigorous operation determination".

The player holds the input device such that the first direction and the second direction are both present in the vertical plane, and performs the operation of inclining the input device while keeping such a state. Therefore, it can be determined that when the value of the "acceleration by the movement on an arc" included in the first acceleration data is increased by making the operation of inclining the input device performed by the player more vigorous, the value of the "acceleration by the movement on an arc" included in the second acceleration data is increased. Namely, it can be determined that the second acceleration data also includes a large "acceleration by the movement on an arc" in addition to a second direction component of the gravitational acceleration. In such a case, the first parameter setting step stops setting the first parameter based on the second acceleration data, and sets the first parameter to a predetermined value. Owing to this, the first parameter is guaranteed, to a certain degree, to be a parameter in accordance with the second direction component of the gravitational acceleration. The second component of the gravitational acceleration changes by the inclination of the input device. Therefore, it is guaranteed, to a certain degree, that the first parameter can be set in accordance with the inclination of the input device.

In the first parameter setting step, the second acceleration data may be set as the first parameter, or the first parameter may be set by executing predetermined calculation processing on the second acceleration data. (This is applied to the case where it is described below that "the first parameter is set based on certain data"). In the latter case, the specific content of the calculation processing is arbitrary. Calculation processing by which when the second acceleration data is increased, the first parameter increases or decreases in one way may be used. (In this case, when the second acceleration data is equal to or larger than a certain value or equal to or smaller than the certain value, the first parameter may be set to be the certain value; this is applied to the case where it is described below as "increasing or decreasing in one way".)

The first parameter setting step may set the first parameter based on both the first acceleration data and the second acceleration data when the normal operation determination is made in the first determination step. In this case, for example, inclination data which represents the inclination of the input device with respect to the vertical direction may be calculated based on the first acceleration data and the second acceleration data, and the first parameter may be set based on the inclination data. For this setting, calculation processing by which when the inclination data increases, the first parameter increases or decreases in one way may be used. For example, when the first direction and the second direction are perpendicular to each other, the first acceleration data and the second acceleration data may be substituted for an inverse tangent function, so that angle data, which is inclination data, can be calculated and set as the first parameter.

The first determination step determines which of the first acceleration data and the first threshold value is larger. Further in the second determination step, it may be determined which of the second acceleration data and the second threshold value is larger. As described above, the first threshold value is obtained by adding a predetermined determination value to the maximum value in the first direction component of the gravitational acceleration. Similarly, the second threshold value is obtained by adding a predetermined determination value to the maximum value in the second direction component of the gravitational acceleration. The first parameter setting step may set the first parameter to a predetermined value when the first acceleration data is determined to be larger than the first threshold value in the first determination step and further the second acceleration data is determined to be larger than the second threshold value in the second determination step, and may otherwise set the first parameter based on at least the second acceleration data. Owing to this, the level of vigor at which the input device is operated to be inclined can be accurately determined. The first direction may be a direction which, when the player performs the operation of inclining the input device, perpendicularly crosses an arc which is a trajectory of a movement of a predetermined position in the input device made by the operation. The second direction may be a direction which, when the player performs the operation of inclining the input device, is a tangent direction to the arc. In this case, when the player performs the operation of inclining the input device, a centrifugal force is generated in the first direction, and an acceleration by the force of the operation is generated in the second direction. When the player performs the operation of inclining the input device, the acceleration by the force of the operation is first generated, and the centrifugal force is generated with a delay. Therefore, the determination in the first determination step that the first acceleration data is larger than the first threshold value is made after the determination in the second determination step that the second acceleration data is larger than the second threshold value. Thus, the history of the second acceleration may be stored, so that it can be determined that the maximum value of the second acceleration data obtained in an immediately previous predetermined period is larger than the second threshold value.

In the case where the acceleration detection section is a three-axial acceleration sensor, a third acceleration obtaining step of obtaining third acceleration data representing an acceleration applied in a third direction of the input device (different from the first direction and also the second direction; preferably perpendicularly crossing the first direction and also the second direction) based on a value detected by the acceleration detection section may be executed. In this case, when the normal operation determination is made, the first parameter setting step may set the first parameter based on the first acceleration data, the second acceleration data and the third acceleration data. When the first acceleration data matches the threshold value, the first parameter setting step performs processing in accordance with the normal operation determination or the vigorous operation determination, needless to say. When the normal operation determination is made, the first parameter setting step sets the first parameter based on at least the second acceleration data. At this point, the value of the first parameter may be limited to a predetermined range. (Only an upper limit, only a lower limit, or both the upper limit and the lower limit may be set.) Specifically, when the first parameter which is calculated by executing predetermined processing based on at least the second acceleration data is outside a predetermined range, the first parameter may be set to a border value (the upper limit or the lower limit) of the predetermined range. When the vigorous operation determination is made, the first parameter setting step sets the first parameter to a predetermined value. This predetermined value may be either a border value (the upper limit or the lower limit) of the predetermined range, a value larger than the upper limit, or a value smaller than the lower limit. Namely, where the first parameter can be set to a value in the range of p1 to p2 based on the second acceleration data when the normal operation determination is made, the first parameter may be set to either p1, a value smaller than p1, p2, or a value larger than p2 when the vigorous operation determination is made. When the normal operation determination is made, the first parameter setting step executes calculation processing by which the first parameter calculated when the second acceleration data is a1 to a2 (a1<a2) is p1 to p2 (p1<p2). Such calculation processing may be either (a) or (b) below.

(a) Calculation processing by which the second acceleration data a1 corresponds to the first parameter p1, the second acceleration data a2 corresponds to the first parameter p2, and the first parameter increases as the second acceleration data increases.

(b) Calculation processing by which the second acceleration data a1 corresponds to the first parameter p2, the second acceleration data a2 corresponds to the first parameter p1, and the first parameter decreases as the second acceleration data increases.

When processing (a) is executed and the vigorous operation determination is made in the first determination step and the second determination step, the first parameter may be set to p2 or a predetermined value larger than p2. When processing (b) is executed, the second determination step is executed, and the vigorous operation determination is made in the first determination step and the second determination step, the first parameter may be set to p1 or a predetermined value smaller than p1.

Hereinafter, a typical example will be described. The first direction is the forward direction, and the second direction is the upward direction. When the normal operation determination is made, the first parameter setting section substitutes the first acceleration data and the second acceleration data for an inverse tangent function to calculate angle data $\theta c$ (data representing the inclination of the input device). Based on the angle data $\theta c$, "data $\theta o$ representing the magnitude of the inclination of the game object" as the first parameter is set. Typically, the data $\theta o$ is data representing the magnitude of the inclination with respect to the virtual vertical direction in the virtual space (hereinafter, referred to simply as the "inclination data"). As described below, the data $\theta o$ may be target inclination data for the game object. Based on the data $\theta o$, the processing of displaying the game object is executed. In this manner, the game object can be displayed as being inclined in the virtual space by inclining the input device. The angle data $\theta c$ may be used as the data $\theta o$, or data $\theta o$ is obtained by executing predetermined calculation on the angle data $\theta c$. In the latter case, the data $\theta o$ may be obtained by adding a predetermined value to, or subtracting a predetermined value from, the angle data $\theta c$. Alternatively, the data $\theta o$ may be obtained by multiplying the angle data $\theta c$ by a predetermined value. The data $\theta o$ may be obtained by inverting the sign (positive or negative) of the angle data $\theta c$. In this case, the data $\theta o$ may be set to decrease as the angle data $\theta c$ increases. In the following example, the data $\theta o$ increases as the angle data $\theta c$ increases. Also in the following example, the data $\theta c$ represents an angle with respect to the horizontal plane with an angle in the upward direction having a positive value, and the data $\theta o$ represents an angle with respect to the virtual horizontal plane (the horizontal plane in the virtual space) with an angle in the virtual upward direction (the upward vertical direction in the virtual space) having a positive value. As can be appreciated by those skilled in the art, what the angle data $\theta c$ and the data $\theta o$ are based on, or the direction of positive or negative values is not limited to such setting. When data calculated when the normal operation determination is made is equal to or less than $\theta c1$, the inclination data of the game object is set to $\theta o1$. When the vigorous operation determination is made, the inclination data of the game object is set to $\theta o1$ or a value smaller than $\theta o1$. When the first acceleration data is determined to be larger than the first threshold value in the first determination step and further the second acceleration data is determined to be larger than the second threshold value in the second determination step, the inclination data of the game object is set to $\theta o1$ or a value smaller than $\theta o1$.

In a second aspect based on the first aspect, the game causes a player to perform an operation of inclining the input device. The first direction is a direction in which, when the player performs the operation of inclining the input device, a centrifugal force is generated. The second direction is a direction in which, when the player performs the operation of inclining the input device, an acceleration is generated by a force of the operation.

In a third aspect based on the first aspect, the game causes a player to perform an operation of inclining the input device. The first direction is a direction which, when the player performs the operation of inclining the input device, perpendicularly crosses an arc which is a trajectory of a movement of a predetermined position in the input device made by the operation. The second direction is a direction which, when the player performs the operation of inclining the input device, is a tangent direction to the arc.

In a fourth aspect based on the first aspect, the first setting processing sets the first parameter to a predetermined value when a value calculated by the predetermined calculation processing based on the second acceleration data is outside a predetermined range. The second setting processing sets the first parameter to a border value of the predetermined range or a predetermined value outside the predetermined range.

In a fifth aspect based on the fourth aspect, the predetermined calculation processing causes the first parameter to change in one way in accordance with an increase in the second acceleration data.

In a sixth aspect based on the first aspect, the game causes a player to perform an operation of inclining the input device so as to keep the first direction and the second direction to be present in a vertical plane and so as to cause an inclination of the first direction with respect to a gravity direction is in a predetermined range. The first threshold value is larger than a maximum value of a gravitational acceleration generated in the first direction when the input device is inclined within the predetermined range.

In a seventh aspect based on the first aspect, the game program causes the computer to further execute a removing step of removing a gravity component applied in the first direction from the first acceleration data obtained in the first acceleration obtaining step. The first determination step determines whether or not the first acceleration data after the gravity component is removed in the removing step is smaller than the first threshold value.

In an eighth aspect based on the seventh aspect, the game program causes the computer to further execute a difference calculation step (S9), a determination step and a storage step. The difference calculation step calculates difference data between the first acceleration data of the current time which is obtained in the first acceleration obtaining step and the first acceleration data of the immediately previous time, and/or difference data between the second acceleration data of the current time which is obtained in the second acceleration obtaining step and the second acceleration data of the immediately previous time. The determination step determines whether or not the difference data calculated in the difference calculation step is smaller than a threshold value. The storage step, at least when the difference data is determined to be smaller than the threshold value in the determination step, stores the first acceleration data of the current time obtained in the first acceleration obtaining step. The removing step subtracts data stored in the storage step from the first acceleration data of the current time obtained in the first acceleration obtaining step.

In a ninth aspect based on the first aspect, the first setting processing calculates angle data representing an angle of the input device with respect to a gravity direction based on at least the second acceleration data, sets the first parameter based on the angle data, and when the angle data represents an angle outside a predetermined range, sets the first parameter to a predetermined value. The first threshold value is larger than a maximum value of a gravitational acceleration generated in the first direction when the input device is inclined within the predetermined range, in the predetermined calculation processing.

In a tenth aspect based on the first aspect, the game program causes the computer to further execute a second determination step of determining whether the second acceleration data is smaller than a second threshold value. The first parameter setting step executes the second setting processing when the first acceleration data is determined to be larger than the first threshold value in the first determination step and further the second acceleration data is determined to be larger than the second threshold value in the second determination step.

In an eleventh aspect based on the tenth aspect, the game causes a player to perform an operation of inclining the input device so as to keep the first direction and the second direction to be present in a vertical plane and so as to cause an inclination of the first direction with respect to a gravity direction is in a predetermined range. The second threshold value is larger than a maximum value of a gravitational acceleration generated in the second direction when the input device is inclined within the predetermined range.

In a twelfth aspect based on the tenth aspect, the predetermined calculation processing causes the first parameter to increase in one way in accordance with an increase in the second acceleration data. The first setting processing sets the first parameter to a predetermined value when a value calculated by the predetermined calculation processing based on the second acceleration data is larger than a predetermined value. The second setting processing sets the first parameter to the predetermined value or another predetermined value larger than the predetermined value.

In a thirteenth aspect based on the tenth aspect, the predetermined calculation processing causes the first parameter to decrease in one way in accordance with an increase in the second acceleration data. The first setting processing sets the first parameter to a predetermined value when a value calculated by the predetermined calculation processing based on the second acceleration data is smaller than a predetermined value. The second setting processing sets the first parameter to the predetermined value or another predetermined value smaller than the predetermined value.

In a fourteenth aspect based on the first aspect, the first setting processing calculates the first parameter by executing predetermined calculation processing based on at least the first acceleration data and the second acceleration data.

In a fifteenth aspect based on the fourteenth aspect, the predetermined calculation processing calculates angle data representing an angle of the input device with respect to a gravity direction as the first parameter based on at least the first acceleration data and the second acceleration data.

In a sixteenth aspect based on the fifteenth aspect, the predetermined calculation processing substitutes the first acceleration data and the second acceleration data for an inverse tangent function.

In a seventeenth aspect based on the fourteenth aspect, the first setting processing sets the first parameter to a predetermined value when a value calculated by the predetermined calculation processing based on the first acceleration data and the second acceleration data is outside a predetermined range. The second setting processing sets the first parameter to a border value of the predetermined range or a predetermined value outside the predetermined range.

In an eighteenth aspect based on the fifteenth aspect, the first setting processing sets the first parameter to a predetermined angle when the calculated angle data is outside a predetermined range. The second setting processing sets the first parameter to a border angle of the predetermined range or a predetermined angle outside the predetermined range. The first threshold value is larger than a maximum value of a component of the first direction of the gravitational acceleration at an angle of the input device with respect to a gravity direction, the angle being included in the predetermined range.

In a nineteenth aspect based on the tenth aspect, the game program causes the computer to further execute a history storage step of storing a history of the second acceleration data obtained in the second acceleration obtaining step on a storage section accessible by the computer. The second determination step refers to the history stored on the storage section to at least determine whether or not maximum data of the second acceleration data in an immediately previous predetermined period is larger than the second threshold value. The first parameter setting step executes the second setting processing when the first acceleration data is determined to be larger than the first threshold value in the first determination step and further the maximum data is determined to be larger than the second threshold value in the second determination step.

A twentieth aspect according certain example embodiments is directed to a storage medium having stored thereon a game program executable by a computer of a game apparatus capable of using a value detected by an acceleration detection section provided in an input device for detecting an acceleration in at least two directions. The game causes a player to perform an operation of inclining the input device. The game program causes the computer to execute a first acceleration obtaining step (S2), a second acceleration obtaining step (S2), a first determination step (S6), a game input data setting step (S14), and a game processing control step (S16). The first acceleration obtaining step, when the player performs the operation of inclining the input device, obtains first acceleration data representing an acceleration in a direction perpendicularly crossing an arc which is a trajectory of a movement of a predetermined position in the input device made by the operation, based on a value detected by the acceleration detection section. The second acceleration obtaining step obtains second acceleration data representing an acceleration in a tangent direction to the arc when the player performs the operation of inclining the input device, based on a value detected by the acceleration detection section. The first determination step determines whether or not the first acceleration data is smaller than a first threshold value. The game input data setting step, when the first acceleration data is determined to be smaller than the first threshold value in the first determination step, substitutes the first acceleration data and the second acceleration data to calculate inclination data representing an inclination of the input device with respect to a gravity direction and to set the inclination data as a first parameter used in game processing; and at least when the first acceleration data is determined to be larger than the first threshold value in the first determination step, sets the first parameter to a predetermined value. The game processing control step executes the game processing based on the first parameter which is set in the game input data setting step.

A twenty-first aspect of certain example embodiments is directed to a storage medium having stored thereon a game program executable by a computer of a game apparatus capable of using a value detected by an acceleration detection section provided in an input device for detecting an acceleration in at least two directions. The game program causes the computer to execute a first acceleration obtaining step (S2), a second acceleration obtaining step (S2), a history storage step, a first determination step, a second determination step, and a game processing control step (S16). The first acceleration obtaining step obtains first acceleration data representing an acceleration applied in a first direction of the input device, based on a value detected by the acceleration detection section. The second acceleration obtaining step obtains second acceleration data representing an acceleration applied in a second direction of the input device which is different from the first direction, based on a value detected by the acceleration detection section. The history storage step stores a history of the second acceleration data obtained in the second acceleration obtaining step on a storage section accessible by the computer. The first determination step determines whether or not the first acceleration data is smaller than a first threshold value. The second determination step refers to the history stored on the storage section to at least determine whether or not maximum data of the second acceleration data in an immediately previous predetermined period is larger than the second threshold value. The game processing control step executes predetermined game processing when the first acceleration data is determined to be larger than the first threshold value in the first determination step and further the maximum data is determined to be larger than the second threshold value in the second determination step.

A twenty-second aspect of certain example embodiments is directed to a game apparatus capable of using a value detected by an acceleration detection section provided in an input device for detecting an acceleration in at least two directions. The game apparatus comprises a first acceleration obtaining section (6, 30), a second acceleration obtaining section (6, 30), a first determination section (30), a first parameter setting section (30), and a game processing control section (30). The first acceleration obtaining section obtains first acceleration data representing an acceleration applied in a first direction of the input device, based on a value detected by the acceleration detection section. The second acceleration obtaining section obtains second acceleration data representing an acceleration applied in a second direction of the input device which is different from the first direction, based on a value detected by the acceleration detection section. The first determination section determines whether or not the first acceleration data is smaller than a first threshold value. The first parameter setting section, when the first acceleration data is determined to be smaller than the first threshold value by the first determination section, executes predetermined calculation processing at least based on the second acceleration data to execute first setting processing of calculating a first parameter used in game processing; and when the first acceleration data is determined to be larger than the first threshold value by the first determination section, executes second setting processing of setting the first parameter to a predetermined value. The game processing control section executes the game processing based on the first parameter which is set by the first parameter setting section.

A twenty-third aspect of certain example embodiments is directed to a game apparatus capable of using a value detected by an acceleration detection section provided in an input device for detecting an acceleration in at least two directions. A game executable by the game apparatus causes a player to perform an operation of inclining the input device. The game apparatus comprises a first acceleration obtaining section (6, 30), a second acceleration obtaining section (6, 30), a first determination section (30), a game input data setting section (30), and a game processing control section (30). The first acceleration obtaining section, when the player performs the operation of inclining the input device, obtains first acceleration data representing an acceleration applied in a direction perpendicularly crossing an arc which is a trajectory of a movement of a predetermined position in the input device made by the operation, based on a value detected by the acceleration detection section. The second acceleration obtaining section obtains second acceleration data representing an acceleration applied in a tangent direction to the arc when the player performs the operation of inclining the input device, based on a value detected by the acceleration detection section. The first determination section determines whether or not the first acceleration data is smaller than a first threshold value. The game input data setting section, when the first acceleration data is determined to be smaller than the first threshold value by the first determination section, substitutes the first acceleration data and the second acceleration data for an inverse tangent function to calculate inclination data representing an inclination of the input device with respect to a gravity direction and to set the inclination data as a first parameter used in game processing; and when the first acceleration data is determined to be larger than the first threshold value by the first determination section, sets the first parameter to a predetermined value. The game processing control section executes the game processing based on the first parameter which is set by the game input data setting section.

A twenty-fourth aspect of certain example embodiments is directed to a game apparatus capable of using a value detected by an acceleration detection section provided in an input device for detecting an acceleration in at least two directions. The game apparatus comprises a first acceleration obtaining section (6, 30), a second acceleration obtaining section (6, 30), a history storage section (33), a first determination section (30), a second determination section (30), and a game processing section (30). The first acceleration obtaining section obtains first acceleration data representing an acceleration applied in a first direction of the input device, based on a value detected by the acceleration detection section. The second acceleration obtaining section obtains second acceleration data representing an acceleration applied in a second direction of the input device which is different from the first direction, based on a value detected by the acceleration detection section. The history storage section stores a history of the second acceleration data obtained by the second acceleration obtaining section on a storage section. The first determination section determines whether or not the first acceleration data is smaller than a first threshold value. The second determination section refers to the history stored on the storage section to at least determine whether or not maximum data of the second acceleration data in an immediately previous predetermined period is larger than the second threshold value. The game processing section executes predetermined game processing when the first acceleration data is determined to be larger than the first threshold value by the first determination section and further the maximum data is determined to be larger than the second threshold value by the second determination section.

According to the first aspect, when the vigor with which the input device is moved exceeds a certain level, the calculation processing on the game parameter based on a detected acceleration value is stopped. Therefore, even when the input device is vigorously moved, data which is not intended by the player can be prevented from being input.

According to the second through fifth aspects, substantially the same effect as that of the first aspect is provided. Especially when the input device is swung, the motion intended by the player can be reflected on the game processing more accurately.

According to the sixth through eleventh aspects, especially regarding the operation of swinging up or swinging down the input device, the motion intended by the player can be reflected on the game processing more accurately.

According to the twelfth and thirteenth aspects, substantially the same effect as that of the first aspect is provided.

According to the fourteenth through seventeenth aspects, the operation of moving the input device can be detected more accurately and reflected on the game processing.

According to the eighteenth aspect, the intention of the player can be more easily reflected on the game processing by correcting the angle. Thus, the operability of the input device can be improved.

According to the nineteenth aspect, the comparison is made with the immediately previous acceleration data. Therefore, the operation of moving the input device in an accelerating manner can be detected more accurately.

According to the twentieth and twenty-first aspects, substantially the same effect as that of the first aspect is provided.

A game apparatus according to certain example embodiments provides substantially the same effect as that of the above-described game program according to certain example embodiments.

These and other objects, features, aspects and advantages of certain example embodiments will become more apparent from the following detailed description when taken in conjunction with the accompanying drawings.

DETAILED DESCRIPTION

Embodiments of the present invention will be described with reference to the drawings. The following embodiments are not intended to limit the present invention in any way.

Figure 1:
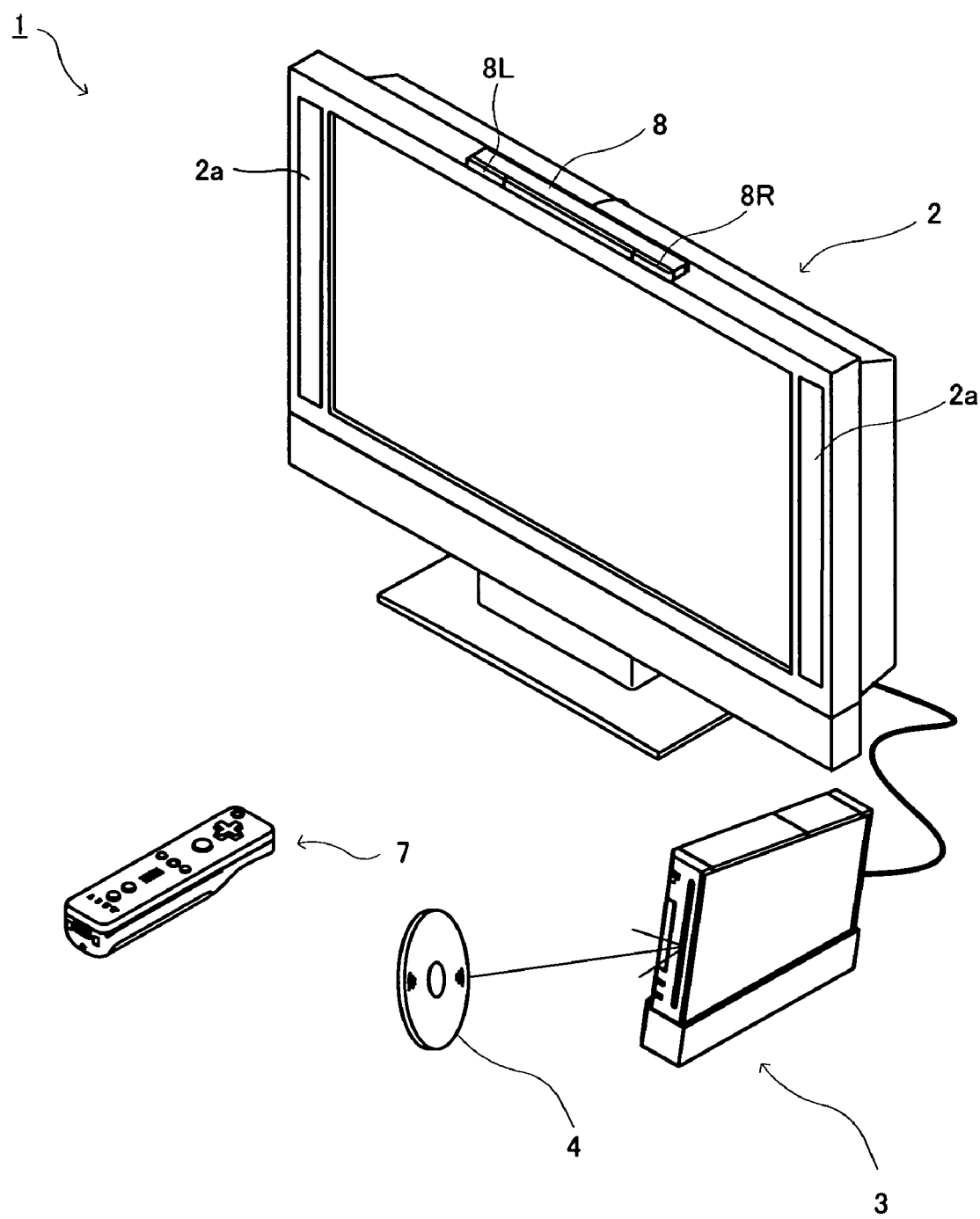
FIG. 1 is an external view of a game system 1 according to an embodiment.
Figure 2:
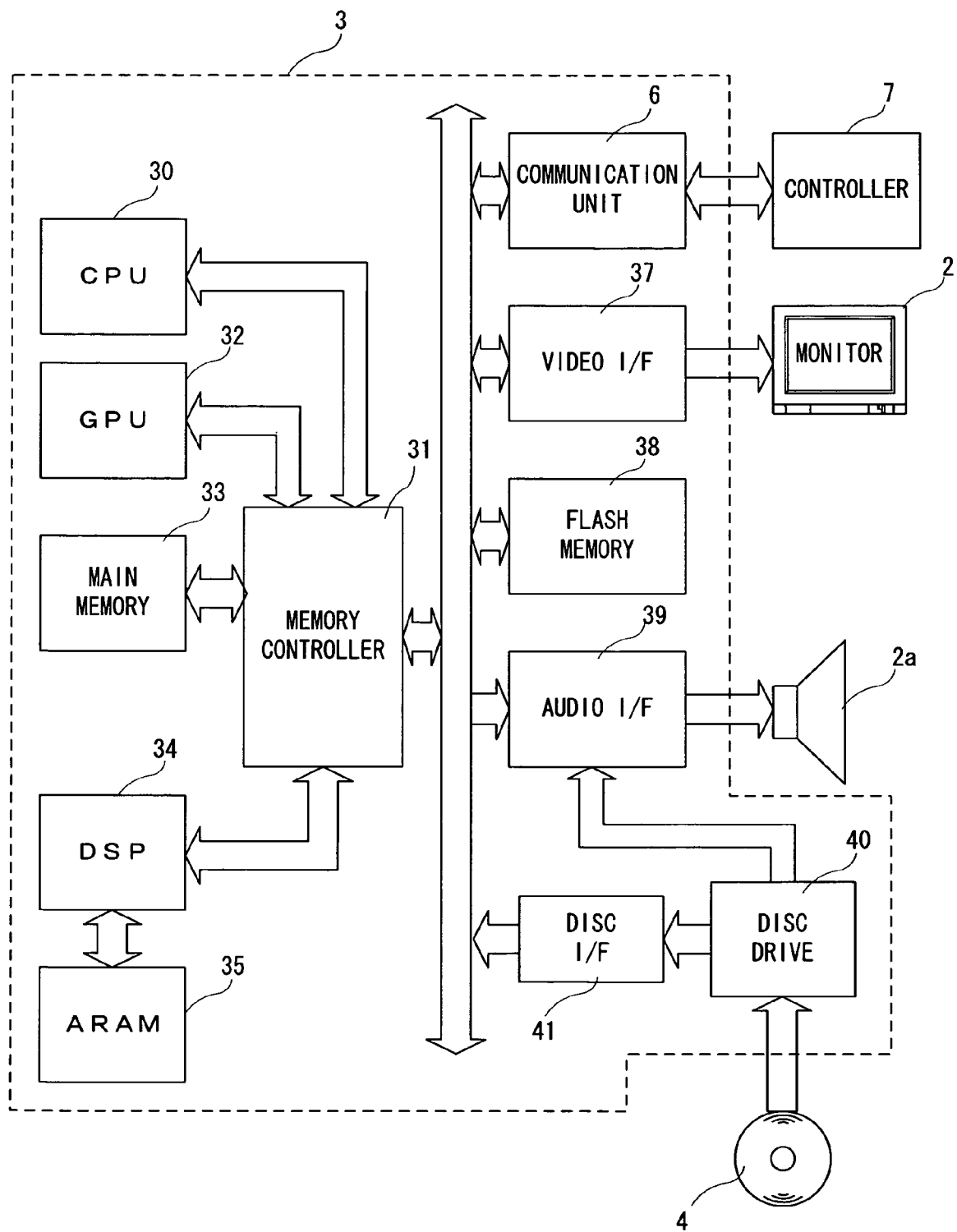
FIG. 2 is a functional block diagram of a game apparatus main body 3 shown in FIG. 1.

With reference to FIG. 1, an information processing apparatus according to an embodiment will be described. In order to give a specific description, a game system 1 including an installation type game apparatus main body 3 as an exemplary information processing game apparatus according to certain example embodiments will be described. FIG. 1 is an external view of the game system 1 including the installation type game apparatus main body 3. FIG. 2 is a block diagram of the game apparatus main body 3. Hereinafter, the game system 1 will be described.

As shown in FIG. 1, the game system 1 includes a home-use TV receiver (hereinafter, referred to as a "monitor") 2 as an example of display means and the installation type game apparatus main body 3 connected to the monitor 2 via a connection cord. The monitor 2 includes speakers 2a for outputting an audio signal which is output from the game apparatus main body 3. The game system 1 further includes an optical disc 4 having stored thereon a game program as an exemplary information processing program according to certain example embodiments. The game apparatus main body 3 has a computer mounted thereon for executing the game program stored on the optical disc 4 and causing the monitor 2 to display a game screen. The game system 1 includes a controller 7 for providing the game apparatus main body 3 with operation information required to play a game, for example, images of characters and the like displayed in the game screen.

The game apparatus main body 3 has a built-in communication unit 6 (FIG. 2). The communication unit 6 receives data which is wirelessly transmitted from the controller 7, and transmits data from the game apparatus main body 3 to the controller 7. The controller 7 and the game apparatus main body 3 communicate each other wirelessly. On the game apparatus main body 3, the optical disc 4 as an exemplary exchangeable information storage medium is detachably mounted. The game apparatus main body 3 has, on a front main surface thereof, a power ON/OFF switch, a game processing reset switch, an opening for mounting the optical disc 4, an eject switch for removing the optical disc 4 from the opening, and the like.

On the game apparatus main body 3, a flash memory 38 (FIG. 2) is mounted, which acts as a backup memory for fixedly storing saved data or the like. The game apparatus main body 3 executes a game program or the like stored on the optical disc 4 and displays the result on the monitor 2 as a game image. The game apparatus main body 3 can also reproduce a state of a game played in the past using saved data stored on the flash memory 38 and display the game object on the monitor 2. A player playing with the game apparatus main body 3 can enjoy the game by operating the controller 7 while watching the game image displayed on the monitor 2.

The controller 7 wirelessly transmits transmission data such as operation information or the like to the game apparatus main body 3 having the built-in communication unit 6, using the technology of Bluetooth (registered trademark) or the like. The controller 7 is operation means for mainly operating a player object or the like appearing in a game space displayed on a display screen of the monitor 2. The controller 7 includes a housing which is small enough to be held by one hand, and a plurality of operation buttons (including a cross key, a stick and the like) exposed on a surface of the housing. As described later in detail, the controller 7 also includes an imaging information calculation section 74 (FIG. 4) for taking an image of an image viewed from the controller 7. As an example of an imaging target of the imaging information calculation section 74, two LED modules (hereinafter, referred to as "markers") 8L and 8R are provided in the vicinity of the display screen of the monitor 2. The markers 8L and 8R each output infrared light forward from the monitor 2. The controller 7 can generate a sound or vibration in accordance with the transmission data which is wirelessly transmitted from the communication unit 6 of the game apparatus main body 3 and received by a communication section 75 (FIG. 7) in the controller 7.

As shown in FIG. 2, the game apparatus main body 3 includes, for example, a CPU (central processing unit) 30 for executing various types of programs. The CPU 30 executes a start program stored on a boot ROM (not shown) to, for example, initialize memories including a main memory 33, and then executes a game program stored on the optical disc 4 to perform game processing or the like in accordance with the game program. The CPU 30 is connected to a GPU (Graphics Processing Unit) 32, the main memory 33, a DSP (Digital Signal Processor) 34, an ARAM (Audio RAM) 35 and the like via a memory controller 31. The memory controller 31 is connected to the communication unit 6, a video I/F (interface) 37, the flash memory 38, an audio I/F 39, and a disc I/F 41 via a predetermined bus. The video I/F 37, the audio I/F 39 and the disc I/F 41 are respectively connected to the monitor 2, the speaker 2a and a disc drive 40.

The GPU 32 performs image processing based on an instruction from the CPU 30. The GPU 32 includes, for example, a semiconductor chip for performing calculation processing necessary for displaying 3D graphics. The GPU 32 performs the image processing using a memory dedicated for image processing (not shown) or a part of the storage area of the main memory 33. The GPU 32 generates game image data and a movie to be displayed on the monitor 2 using such memories, and outputs the generated data or movie to the monitor 2 via the memory controller 31 and the video I/F 37 as necessary.

The main memory 33 is a storage area used by the CPU 30, and stores a game program or the like necessary for processing performed by the CPU 30 as necessary. For example, the main memory 33 stores a game program, various types of data or the like read from the optical disc 4 by the CPU 30. The game program, the various types of data or the like stored on the main memory 33 are executed by the CPU 30.

The DSP 34 processes sound data or the like generated by the CPU 30 during the execution of the game program. The DSP 34 is connected to the ARAM 35 for storing the sound data or the like. The ARAM 35 is used when the DSP 34 performs predetermined processing (e.g., storage of the game program or sound data already read). The DSP 34 reads the sound data stored on the ARAM 35 and outputs the sound data to the speaker 2a included in the monitor 2 via the memory controller 31 and the audio I/F 39.

The memory controller 31 comprehensively controls data transfer, and is connected to the various I/Fs described above. The communication unit 6 is connected to the game apparatus main body 3 via the bus. As described above, the communication unit 6 receives transmission data from the controller 7 and outputs the transmission data to the CPU 30. The communication unit 6 also transmits transmission data which is output from the CPU 30 to the communication section 75 of the controller 7. The video I/F 37 is connected to the monitor 2. The audio I/F 39 is connected to the speaker 2a built in the monitor 2, such that the sound data read by the DSP 34 from the ARAM 35 or sound data directly output from the disc drive 40 is output through the speaker 2a. The disc I/F 41 is connected to the disc drive 40. The disc drive 40 reads data stored at a predetermined reading position of the optical disc 4 and outputs the data to a bus of the game apparatus main body 3 or the audio I/F 39.

Figure 3:
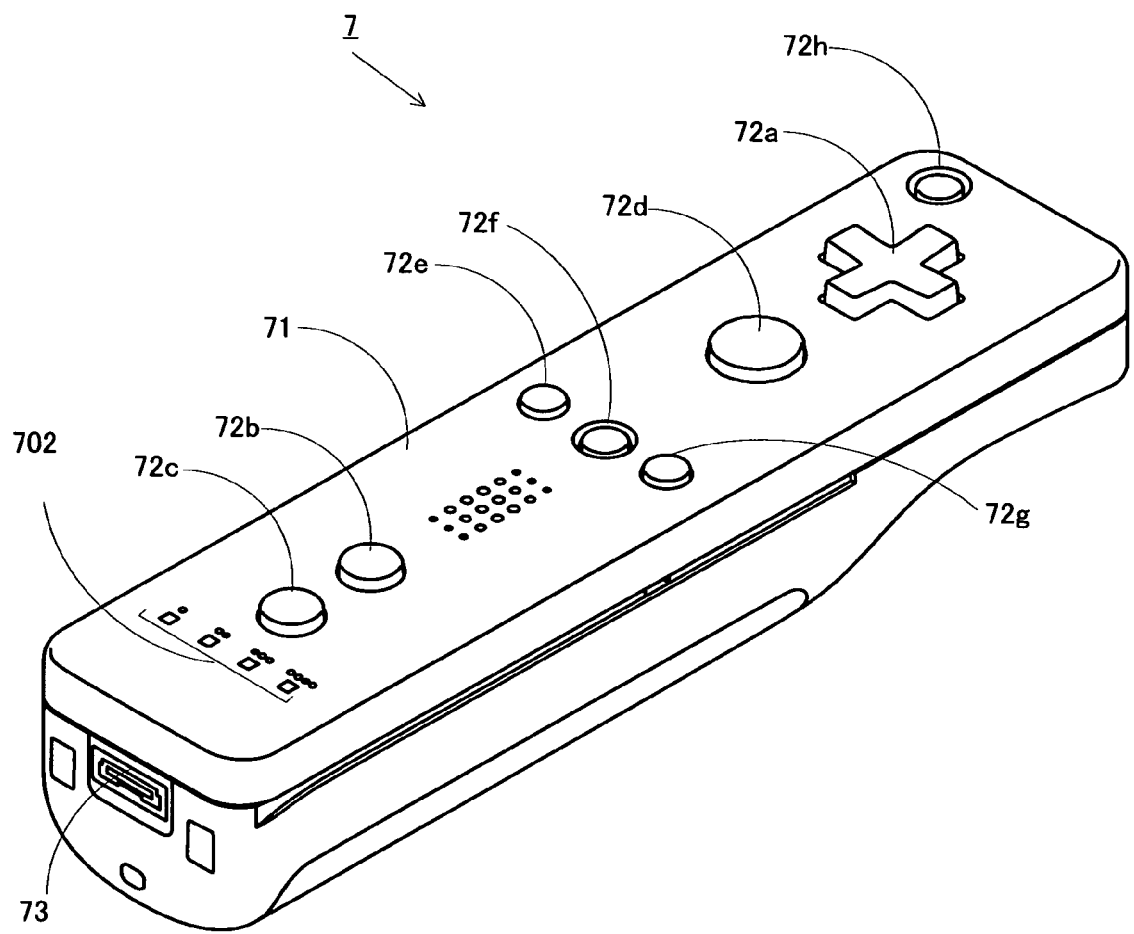
FIG. 3 is an isometric view of a controller 7 shown in FIG. 1 seen from the top rear side thereof.
Figure 3:
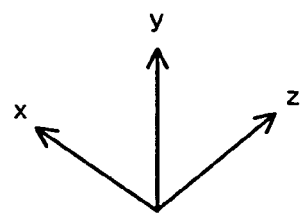
Figure 4:
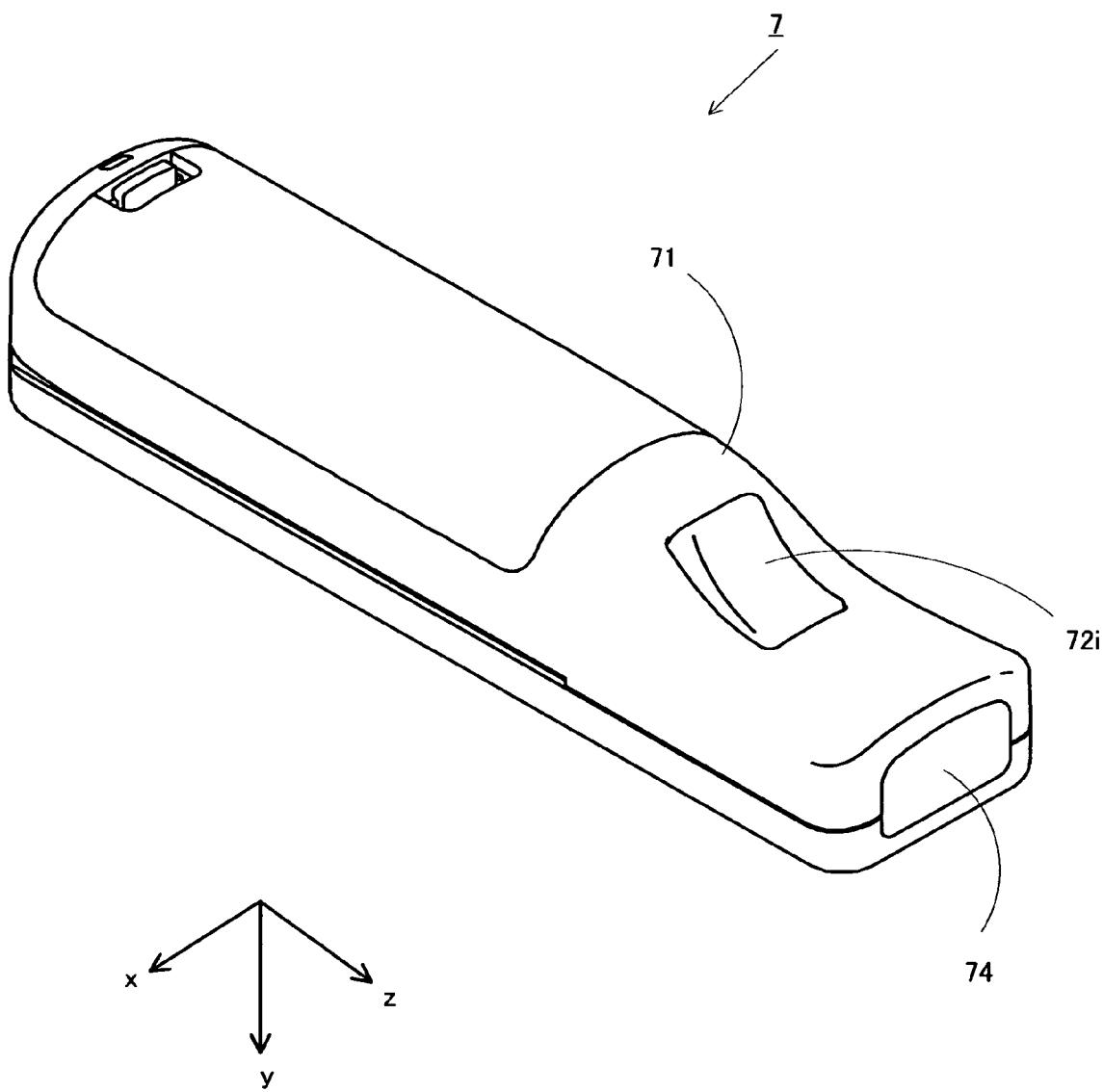
FIG. 4 is an isometric view of the controller 7 shown in FIG. 3 seen from the bottom front side thereof.

With reference to FIG. 3 and FIG. 4, the controller 7 will be described. FIG. 3 is an isometric view of the controller 7 seen from the top rear side thereof. FIG. 4 is an isometric view of the controller 7 seen from the bottom front side thereof.

As shown in FIG. 3 and FIG. 4, the controller 7 includes a housing 71 and an operation section 72 including a plurality of operation buttons provided on surfaces of the housing 71. In this embodiment, the housing 71 has a generally parallelepiped shape extending in a longitudinal direction from front to rear. The overall size of the housing 71 is small enough to be held by one hand of an adult or even a child. The housing 71 is formed by plastic molding or the like.

At the center of a front part of a top surface of the housing 71, a cross key 72a is provided. The cross key 72a is a cross-shaped four-direction push switch. The cross key 72a includes projecting operation portions corresponding to the four directions (front, rear, right and left) and arranged at an interval of 90 degrees. The player selects one of the front, rear, right and left directions by pressing one of the operation portions of the cross key 72a. Through an operation on the cross key 72a, the player can, for example, instruct a direction in which a player character or the like appearing in a virtual game world is to move or select one of a plurality of alternatives.

The cross key 72a is an operation section for outputting an operation signal in accordance with the above-described direction input operation performed by the player, but such an operation section may be provided in another form. For example, the operation section may include four push switches provided in a cross arrangement, and output an operation signal in accordance with the push switch which has been pressed. The operation section may further include a center switch provided at the intersection of the cross in addition to the four push switches. Alternatively, the cross key 72a may be replaced with an operation section which includes an inclinable stick (so-called joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Rearward to the cross key 72a on the top surface of the housing 71, a plurality of operation buttons 72b through 72g are provided. The operation buttons 72b through 72g are each an operation section for outputting a respective operation signal when the player presses a head thereof. For example, the operation buttons 72b through 72d are assigned functions of a first button, a second button, and an A button. The operation buttons 72e through 72g are assigned functions of a minus button, a home button and a plus button, for example. The operation buttons 72b through 72g are assigned various functions in accordance with the game program executed by the game apparatus main body 3. In the exemplary arrangement shown in FIG. 3, the operation buttons 72b through 72d are arranged in a line extending in the forward-rearward direction at the center of the top surface of the housing 71. The operation buttons 72e through 72g are arranged in a line extending in the leftward-rightward direction between the operation buttons 72b and 72d. The operation button 72f has a top surface thereof buried in the top surface of the housing 71, so as not to be inadvertently pressed by the player.

Forward to the cross key 72a on the top surface of the housing 71, an operation button 72h is provided. The operation button 72h is a power switch for remote-controlling the power of the game apparatus main body 3 to be on or off. The operation button 72h also has a top surface thereof buried in the top surface of the housing 71, so as not to be inadvertently pressed by the player.

Rearward to the operation button 72c on the top surface of the housing 71, a plurality of LEDs 702 are provided. The controller 7 is assigned a controller type (number) so as to be distinguishable from the other controllers 7. For example, the LEDs 702 are used for informing the player of the controller type which is currently set to the controller 7 that he/she is using. Specifically, when the controller 7 transmits the transmission data to the communication unit 6, one of the plurality of LEDs corresponding to the controller type is lit up.

On the top surface of the housing 71, sound holes for outputting a sound from a speaker (speaker 706 in FIG. 5) described later are provided between the operation button 72b and the operation buttons 72e through 72g.

On a bottom surface of the housing 71, a recessed portion is formed. As described later in more detail, the recessed portion is formed at a position at which an index finger or middle finger of the player is located when the player holds the controller 7 with one hand in the state where a front surface of the controller 7 is directed toward the markers 8L and 8R. On a slope surface of the recessed portion, an operation button 72i is provided. The operation button 72i is an operation section acting as, for example, a B button.

On the front surface of the housing 71, an imaging element 743 (see FIG. 6) included in the imaging information calculation section 74 is provided. The imaging information calculation section 74 is a system for analyzing image data taken by the controller 7, and detecting the position of the center of gravity, the size and the like of an area having a high brightness in the image data. The imaging information calculation section 74 has, for example, a maximum sampling period of about 200 frames/sec., and therefore can trace and analyze even a relatively fast motion of the controller 7. The structure of the imaging information calculation section 74 will be described later in detail. On a rear surface of the housing 71, a connector 73 is provided. The connector 73 is, for example, an edge connector, and is used for engaging and connecting the controller 7 with a connection cable.

In order to give a specific description below, a coordinate system which is set for the controller 7 will be defined. As shown in FIG. 3 and FIG. 4, x, y and z axes perpendicular to one another are defined for the controller 7. Specifically, the longitudinal direction of the housing 71, i.e., the forward-rearward direction of the controller 7, is set as the z axis. A direction toward the front surface of the controller 7 (the surface having the imaging information calculation section 74) is set as a positive z-axis direction. The upward-downward direction of the controller 7 is set as the y axis. A direction toward the top surface of the controller housing 71 (the surface having the cross key 72a) is set as a positive y-axis direction. The leftward-rightward direction of the controller 7 is set as the x axis. A direction toward a left surface of the housing 71 (the surface which is not shown in FIG. 3 but is shown in FIG. 4) is set as a positive x-axis direction.

Figure 5:
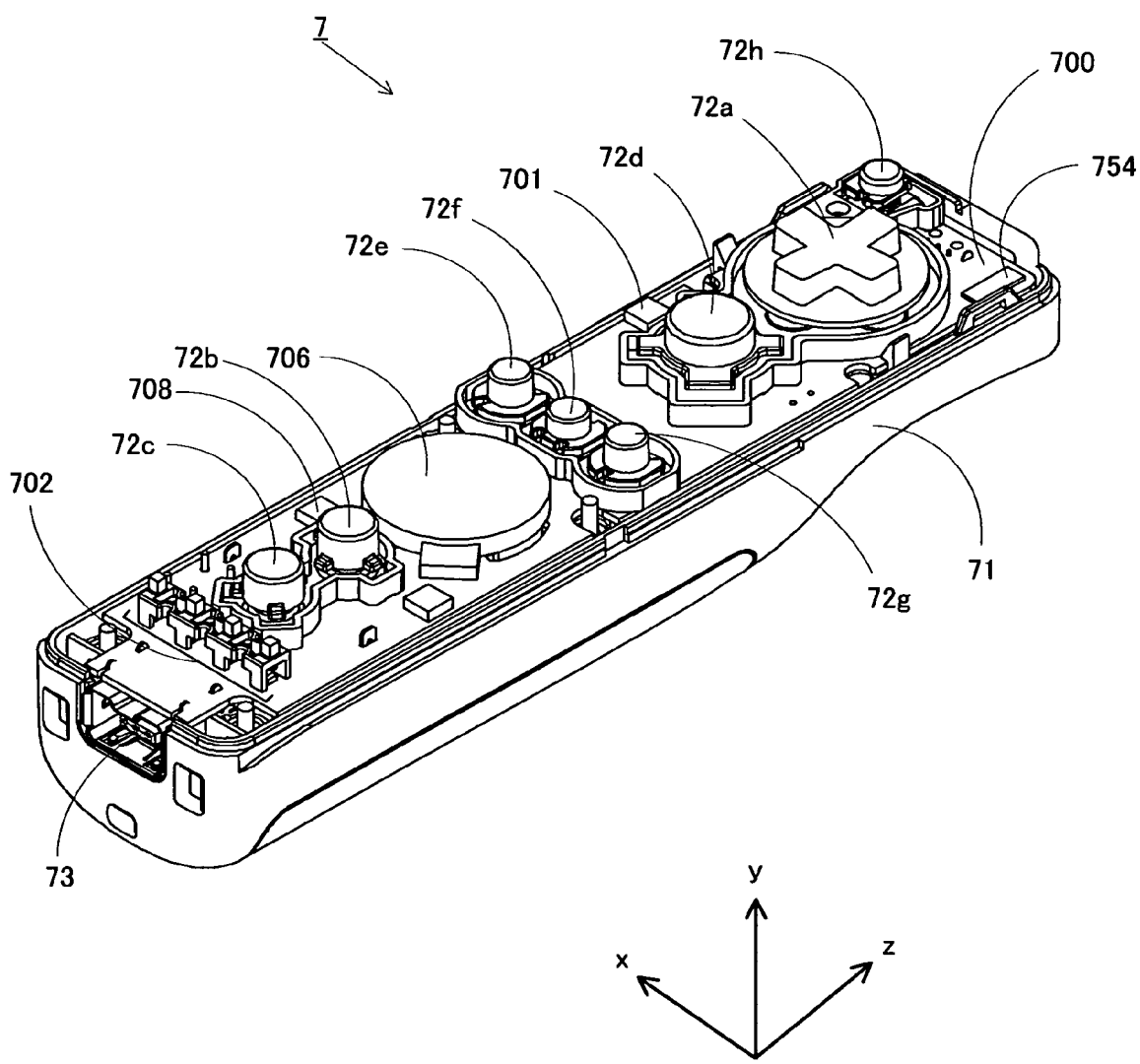
FIG. 5 is an isometric view of the controller 7 shown in FIG. 3 in the state where an upper casing is removed.
Figure 6:
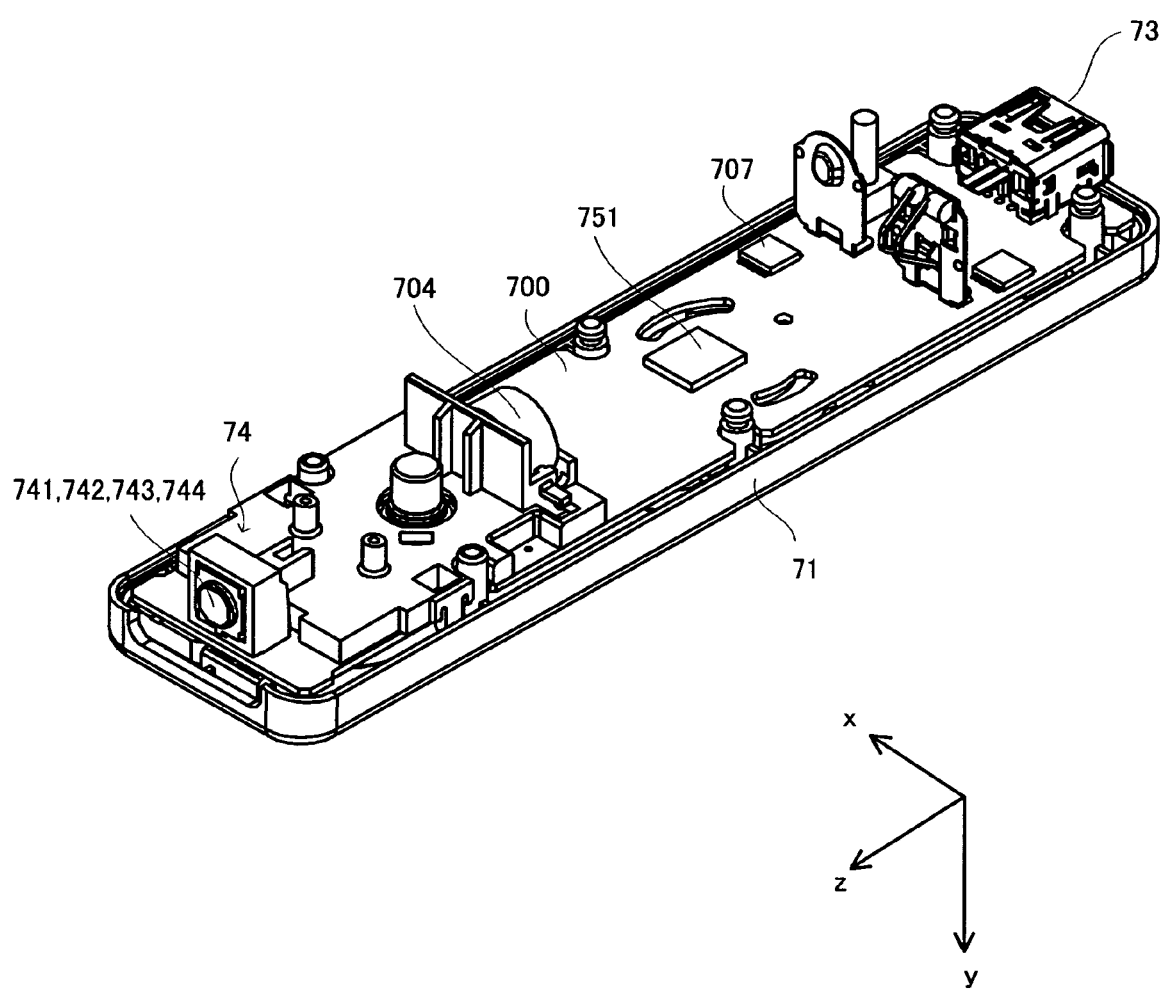
FIG. 6 is an isometric view of the controller 7 shown in FIG. 3 in the state where a lower casing is removed.

With reference to FIG. 5 and FIG. 6, an internal structure of the controller 7 will be described. FIG. 5 is an isometric view of the controller 7 seen from the rear side, illustrating a state where an upper casing (a part of the housing 71) of the controller 7 is removed. FIG. 6 is an isometric view of the controller 7 seen from the front side, illustrating a state where a lower casing (a part of the housing 71) of the controller 7 is removed. FIG. 6 shows a reverse side of a substrate 700 shown in FIG. 5.

As shown in FIG. 5, the substrate 700 is fixed inside the housing 71. On a top main surface of the substrate 700, the operation buttons 72a through 72h, an acceleration sensor 701, the LEDs 702, an antenna 754 and the like are provided. These elements are connected to a microcomputer 751 (see FIG. 6 and FIG. 7) or the like via lines (not shown) formed on the substrate 700 or the like. The microcomputer 751 acts as button data generation means of certain example embodiments so as to generate operation button data in accordance with the type of the operated button, such as the operation button 72a or the like. This mechanism is known and is realized by, for example, the microcomputer 751 detecting that the line is connected or disconnected by a switch mechanism such as a tact switch provided below the keytop. More specifically, when an operation button is pressed, the line is connected to be conductive. The microcomputer 751 detects the operation button connected to the line which has become conductive, and generates a signal in accordance with the type of the detected operation button.

The controller 7 acts as a wireless controller owing to a wireless module 753 (see FIG. 7) and the antenna 754. The housing 71 accommodates a quartz vibrator for generating a reference clock of the microcomputer 751 described later in detail. On the top main surface of the substrate 700, the speaker 706 and an amplifier 708 are provided. The acceleration sensor 701 is provided on the substrate 700 to the left of the operation button 72d (i.e., in a peripheral area of the substrate 700, not in a central area). Owing to such an arrangement, as the controller 7 rotates around the longitudinal direction thereof, the acceleration sensor 701 detects an acceleration including a centrifugal force component in addition to a component of direction change of gravitational acceleration. As a result, the game apparatus main body 3 or the like can determine the rotation of the controller 7 at a high sensitivity based on the detected acceleration through a predetermined calculation.

As shown in FIG. 6, at a front edge of a bottom main surface of the substrate 700, the image information calculation section 74 is provided. The image information calculation section 74 includes an infrared filter 741, a lens 742, the imaging element 743 and an image processing circuit 744 located in this order from the front surface of the controller 7. These elements are attached to the bottom main surface of the substrate 700. At a rear edge of the bottom main surface of the substrate 700, the connector 73 is attached. On the bottom main surface of the substrate 700, a sound IC 707 and the microcomputer 751 are provided. The sound IC 707 is connected to the microcomputer 751 and the amplifier 708 via lines provided on the substrate 700 or the like, and outputs a sound signal to the speaker 706 via the amplifier 708 in accordance with the sound data transmitted from the game apparatus main body 3.

On the bottom main surface of the substrate 700, a vibrator 704 is attached. The vibrator 704 is, for example, a vibration motor or a solenoid. The vibrator 704 is connected to the microcomputer 751 via lines provided on the substrate 700 or the like, and turns the microcomputer 751 on or off in accordance with vibration data transmitted from the game apparatus main body 3. The controller 7 is vibrated by an actuation of the vibrator 704, and the vibration is conveyed to the player holding the controller 7. Thus, a so-called vibration-responsive game is realized. Since the vibrator 704 is provided slightly forward with respect to the center of the housing 71, the housing 71 held by the player is largely vibrated. Thus, the player easily senses the vibration.

Figure 7:
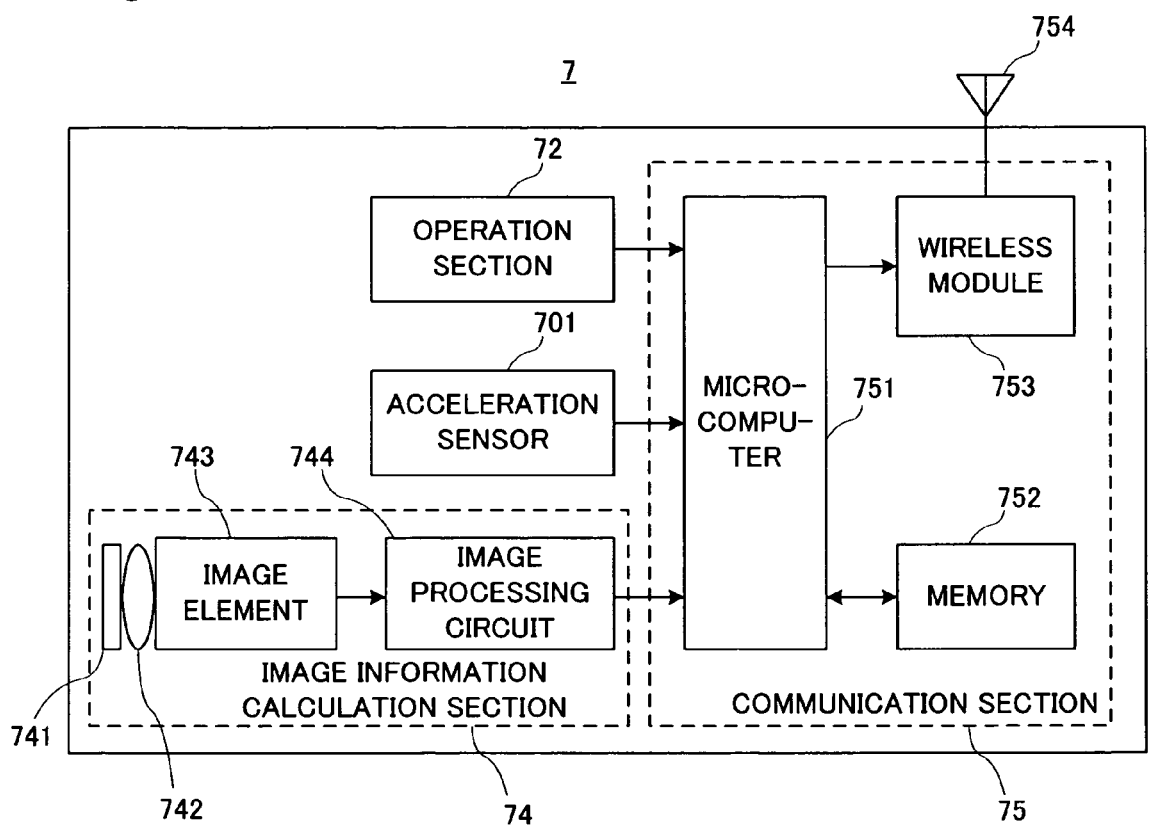
FIG. 7 is a block diagram illustrating a structure of the controller 7 shown in FIG. 3.

With respect to FIG. 7, the internal structure of the controller 7 will be described. FIG. 7 is a block diagram showing the structure of the controller 7.

As shown in FIG. 7, the controller 7 includes a communication section 75 therein in addition to the operation sections 72, the imaging information calculation section 74, the acceleration sensor 701, the vibrator 704, the speaker 706, the sound IC 707 and the amplifier 708 described above.

The imaging information calculation section 74 includes the infrared filter 741, the lens 742, the imaging element 743 and the image processing circuit 744. The infrared filter 741 allows only infrared light to pass therethrough, among light incident on the front surface of the controller 7. The lens 742 collects the infrared light which has passed through the infrared filter 741 and outputs the infrared light to the imaging element 743. The imaging element 743 is a solid-state imaging device such as, for example, a CMOS sensor or a CCD. The imaging element 743 takes an image of the infrared light collected by the lens 742. Accordingly, the imaging element 743 takes an image of only the infrared light which has passed through the infrared filter 741 for generating image data. The image data generated by the imaging element 743 is processed by the image processing circuit 744. Specifically, the image processing circuit 744 processes the image data obtained from the imaging element 743, senses an area thereof having a high brightness, and outputs the processing result data representing the detected position and size of the area to the communication section 75. The imaging information calculation section 74 is fixed to the housing 71 of the controller 7. The imaging direction of the imaging information calculation section 74 can be changed by changing the direction of the housing 71. As described below in more detail, based on the processing result data which is output from the imaging information calculation section 74, a signal in accordance with the position or motion of the controller 7 can be obtained.

The acceleration sensor 701 included in the controller 7 is preferably a three-axial (x, y and z axes) acceleration sensor. The three-axial acceleration sensor 701 detects a linear acceleration in each of three directions, i.e., an upward-downward direction, a leftward-rightward direction, and a forward-rearward direction. In another embodiment, two-axial acceleration detection means for detecting a linear acceleration in each of only the upward-downward direction and the leftward-rightward direction (or directions along another pair of axes) may be used depending on the type of control signals used for game processing. For example, such a three-axial or two-axial acceleration sensor 701 may be available from Analog Devices, Inc. or STMicroelectronics N.V. The acceleration sensor 701 may be of a static capacitance coupling system based on the technology of MEMS (Micro Electro Mechanical Systems) provided by silicon precision processing. Alternatively, the three-axial or two-axial acceleration sensor 701 may be based on an existing acceleration detection technology (e.g., piezoelectric system or piezoelectric resistance system) or any other appropriate technology developed in the future.

As apparent to those skilled in the art, the acceleration detection means used for the acceleration sensor 701 can detect only an acceleration along a straight line corresponding to each of the axes of the acceleration sensor 701 (linear acceleration). Namely, a direct output from the acceleration sensor 701 is a signal indicating the linear acceleration (static or dynamic) along each of two or three axes thereof. Hence, the acceleration sensor 701 cannot directly detect a physical property such as, for example, a motion along a nonlinear path (e.g., an arc path), rotation, revolution, angular displacement, inclination, position or posture.

Nonetheless, those skilled in the art would easily understand from the description of this specification that further information on the controller 7 can be estimated or calculated by executing additional processing on an acceleration signal which is output from the acceleration sensor 701. For example, when a static acceleration (gravitational acceleration) is detected, an inclination of the object (controller 7) with respect to the gravitational vector can be estimated by performing calculations based on the inclination angle and the detected acceleration, using the output from the acceleration sensor 701. By combining the acceleration sensor 701 with the microcomputer 751 (or another processor) in this manner, the inclination, posture or position of the controller 7 can be determined. Similarly, when the controller 7 including the acceleration sensor 701 is dynamically accelerated by a hand of the player or the like, various motions and/or positions of the controller 7 can be calculated or estimated by processing an acceleration signal generated by the acceleration sensor 701. In another embodiment, the acceleration sensor 701 may include a built-in signal processing device, or another type of dedicated processing device, for executing desired processing on an acceleration signal which is output from the built-in acceleration detection means, before the signal is output to the microcomputer 751. For example, when the acceleration sensor 701 is for detecting a static acceleration (e.g., a gravitational acceleration), the built-in or dedicated processing device may convert the detected acceleration signal to a corresponding inclination angle. The data indicating the acceleration detected by the acceleration sensor 701 is output to the communication section 75.

In another embodiment, a gyrosensor having a built-in rotation element or vibration element may be used as a motion sensor for detecting a motion of the controller 7. One exemplary MEMS gyrosensor usable in this embodiment is available from Analog Devices, Inc. Unlike the acceleration sensor 701, a gyrosensor can directly sense a rotation (or an angular rate) around an axis of at least one gyro element built therein. Since a gyrosensor and an acceleration sensor are fundamentally different from each other, either sensor may be selected in accordance with the use. An output signal from the selected sensor needs to be processed in a manner appropriate to the selected sensor.

Specifically, when a gyrosensor is used for calculating an inclination or a posture, instead of an acceleration sensor, significant changes are made. More specifically, when a gyrosensor is used, an inclination value is initialized before the detection is started. The angular rate data which is output from the gyrosensor is integrated. Next, an inclination change amount is calculated from the initialized inclination value. In this case, the calculated inclination corresponds to the angle. By contrast, when an acceleration sensor is used, the inclination is calculated by comparing the value of a gravitational acceleration component of each axis with a predetermined reference value. Therefore, the calculated inclination can be represented with a vector. Even without initialization, an absolute direction detected by the acceleration detection means can be obtained. As for the nature of the value calculated as an inclination, the value calculated using a gyrosensor is an angle whereas the value calculated using an acceleration sensor is a vector. Therefore, when a gyrosensor is used instead of an acceleration sensor, the inclination data needs to be converted as predetermined in consideration of the differences between the two devices. The characteristics of a gyrosensor are known to those skilled in the art as well as the basic differences between two devices, and will not be further described in this specification. A gyrosensor is advantageous in directly sensing a rotation, whereas an acceleration sensor is advantageous in generally having a higher cost efficiency when applied to a controller as used in this embodiment.

The communication section 75 includes the microcomputer 751, a memory 752, the wireless module 753, and the antenna 754. The microcomputer 751 controls the wireless module 753 for wirelessly transmitting the transmission data, while using the memory 752 as a storage area during processing. The microcomputer 751 also controls the operation of the sound IC 707 and the vibrator 704 in accordance with the data transmitted from the game apparatus main body 3 to the wireless module 753 via the antenna 754. The sound IC 707 processes sound data or the like transmitted from the game apparatus main body 3 via the communication section 75. The microcomputer 751 actuates the vibrator 704 in accordance with, for example, the vibration data (e.g., a signal for turning the vibrator 704 on or off) transmitted from the game apparatus main body 3 via the communication section 75.

Data from the controller 7 including an operation signal (key data) from the operation section 72, acceleration signals in the three axial directions (x-axis, y-axis and z-axis direction acceleration data; hereinafter, referred to simply as "acceleration data") from the acceleration sensor 701, and the processing result data from the imaging information calculation section 74 are output to the microcomputer 751. The microcomputer 751 temporarily stores the input data (key data, acceleration data, and the processing result data) in the memory 752 as transmission data which is to be transmitted to the communication unit 6. The wireless transmission from the communication section 75 to the communication unit 6 is performed at a predetermined time interval. Since game processing is generally performed at a cycle of 1/60 sec., the wireless transmission needs to be performed at a cycle of a shorter time period. Specifically, the game processing unit is 16.7 ms (1/60 sec.), and the transmission interval of the communication section 75 structured using the Bluetooth (registered trademark) technology is, for example, 5 ms. At the transmission timing to the communication unit 6, the microcomputer 751 outputs the transmission data stored in the memory 752 as a series of operation information to the wireless module 753. Based on the Bluetooth (registered trademark) technology or the like, the wireless module 753 performs conversion of a carrier wave of a predetermined frequency with the operation information and radiates the carrier signal from the antenna 754. Namely, the key data from the operation section 72, the acceleration data from the acceleration sensor 701, and the processing result data from the imaging information calculation section 74 are converted into a radio wave signal by the wireless module 743 and transmitted from the controller 7. The communication unit 6 of the game apparatus main body 3 receives the carrier wave signal, and the game apparatus main body 3 demodulates or decodes the radio wave signal to obtain the series of operation information (the key data, the acceleration data, and the processing result data). Based on the obtained operation information and the game program, the CPU 30 of the game apparatus main body 3 performs the game processing. In the case where the communication section 75 is structured using the Bluetooth (registered trademark) technology, the communication section 75 can have a function of receiving transmission data which is wirelessly transmitted from other devices.

Figure 8:
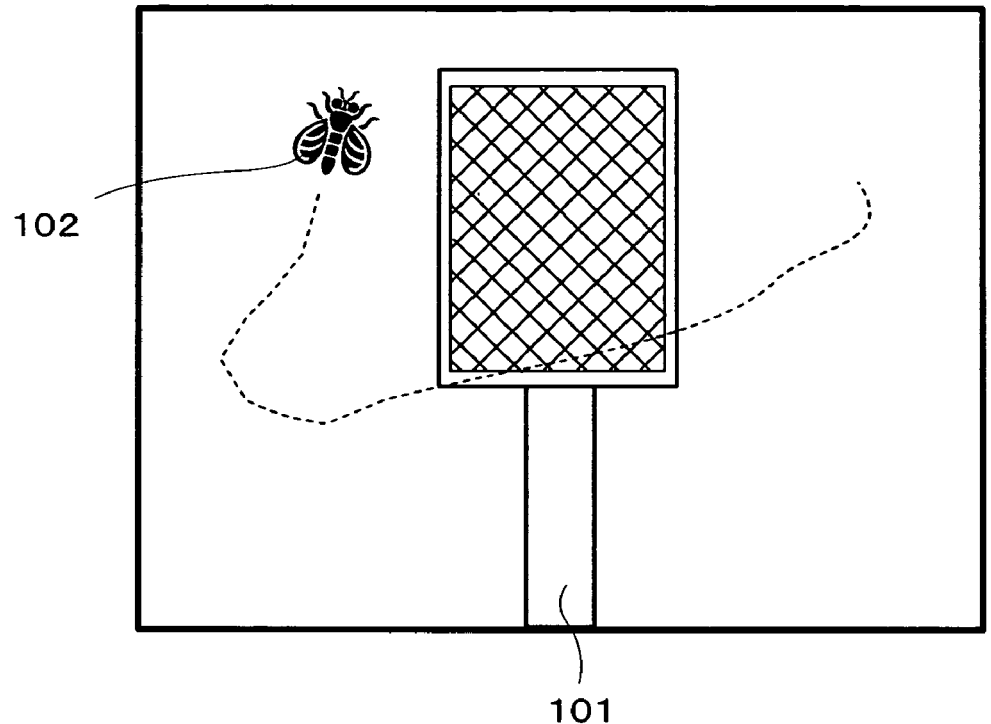
FIG. 8 shows an exemplary game screen displayable in this embodiment.

Hereinafter, with reference to FIG. 8 through FIG. 15, an overview of a game playable in this embodiment will be described. FIG. 8 shows an exemplary game screen displayable in this embodiment. As shown in FIG. 8, a fly swatter 101 and a fly 102 are displayed in the game screen. The fly 102 flies around in the game screen and stops on a wall. In this game, the player swats and kills the fly 102 at the time when the fly stops on the wall.

Figure 9:
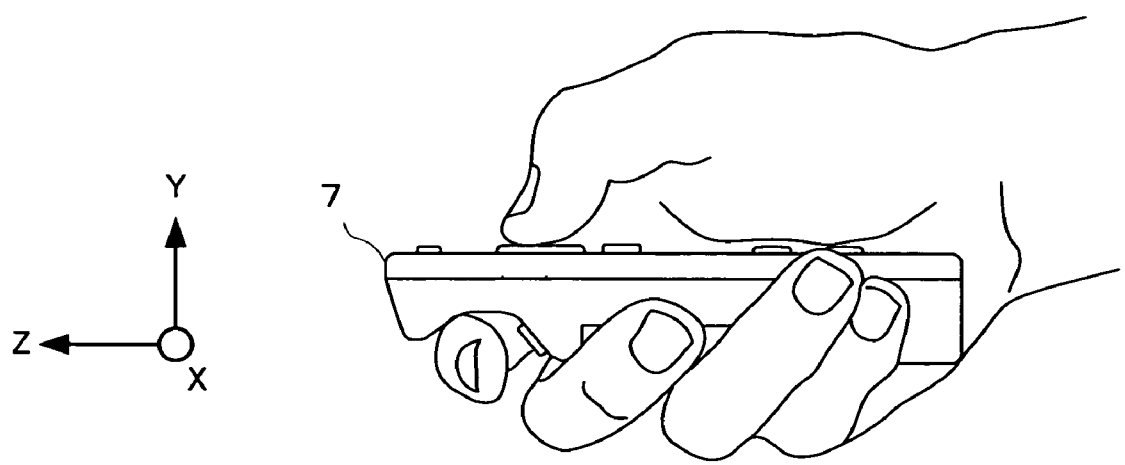
FIG. 9 shows how to perform an operation of a game playable in this embodiment.
Figure 10:
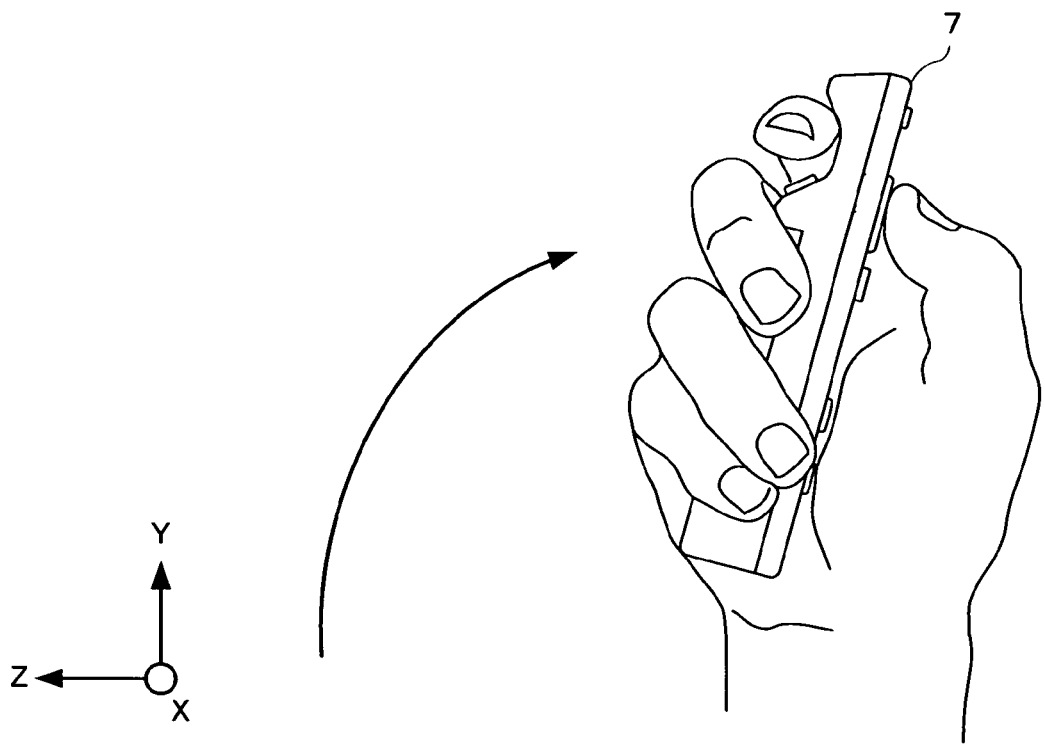
FIG. 10 shows how to perform an operation of the game playable in this embodiment.
Figure 11:
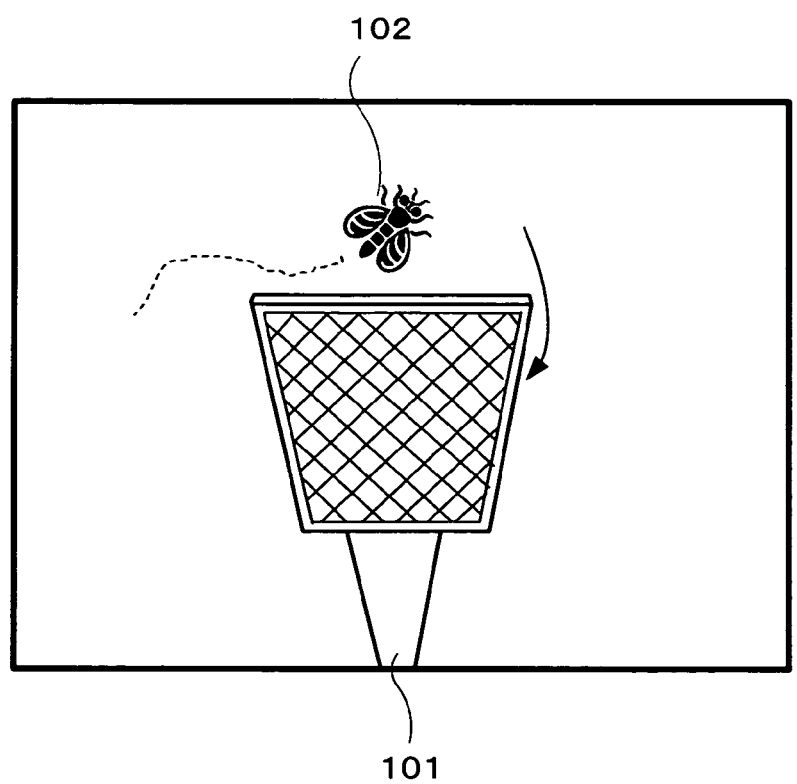
FIG. 11 shows an exemplary game screen displayable in this embodiment.
Figure 12:
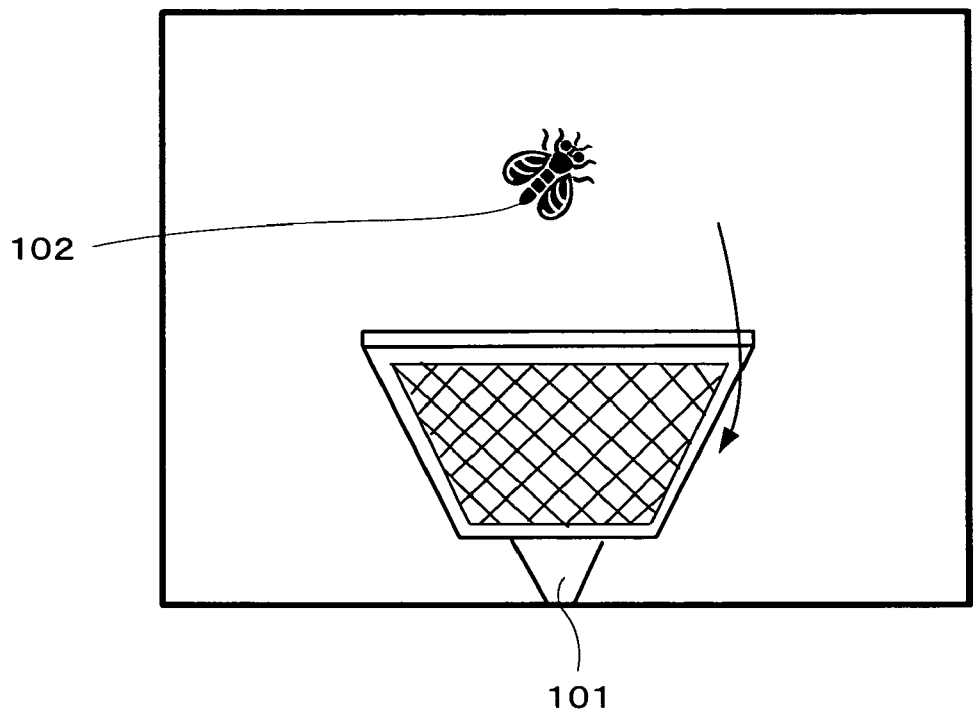
FIG. 12 shows an exemplary game screen displayable in this embodiment.

An operation to be performed by the player in this game will be described. As shown in FIG. 9, the player holds the controller 7 horizontally. This state corresponds to a state shown in FIG. 8 where the fly swatter 101 is put on the wall. (In FIG. 8, the fly 102 still flies around.) From this state, as shown in FIG. 10, the player swings up his/her hand while holding the controller 7. In association with this motion, as shown in FIG. 11 and FIG. 12, the fly swatter 101 in the game screen is also swung up. (In the game screen, the fly swatter 101 is displayed as approaching the player. In FIG. 12, the fly 102 stops on the wall.) In this game, the fly swatter 102 does not move in a transverse direction (in the x axis direction). Namely, even if a movement in the x axis direction is detected when the player moves his/her hand, such a movement is not reflected on the game.

Figure 13:
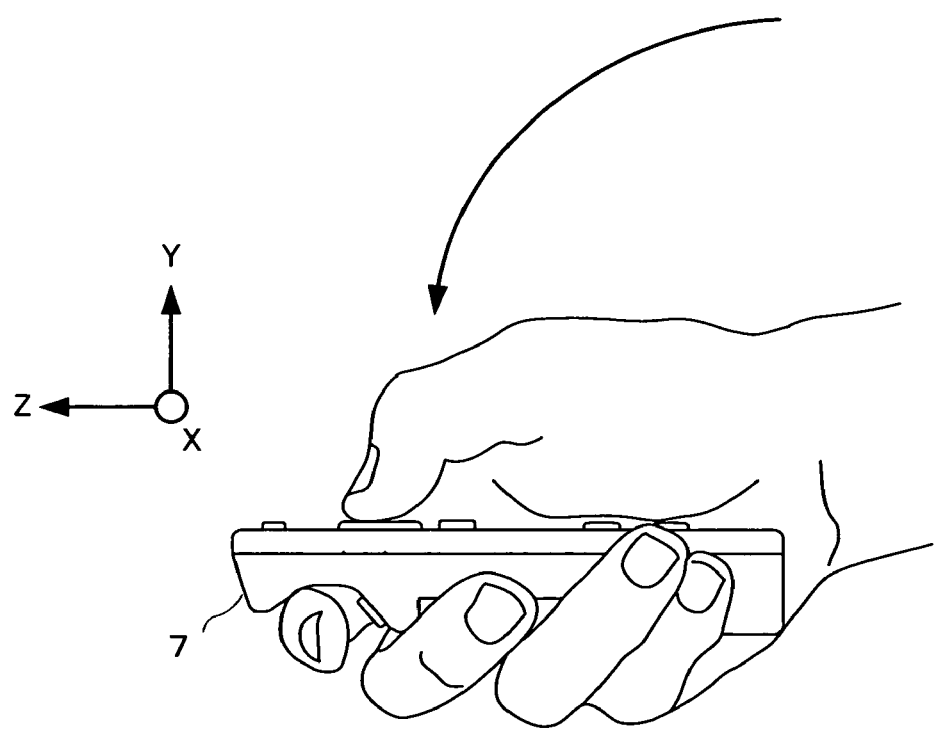
FIG. 13 shows how to perform an operation of the game playable in this embodiment.
Figure 14:
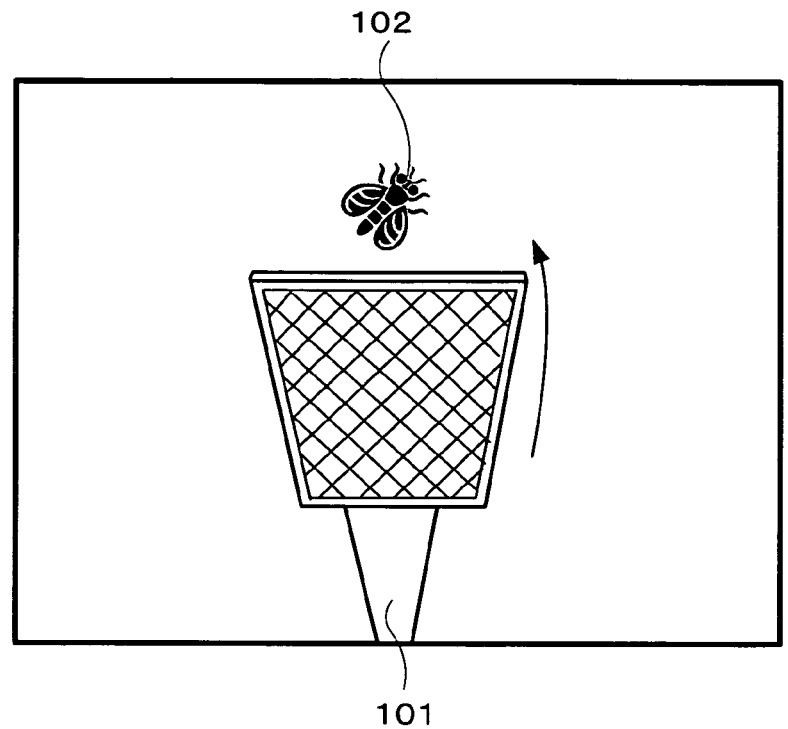
FIG. 14 shows an exemplary game screen displayable in this embodiment.
Figure 15:
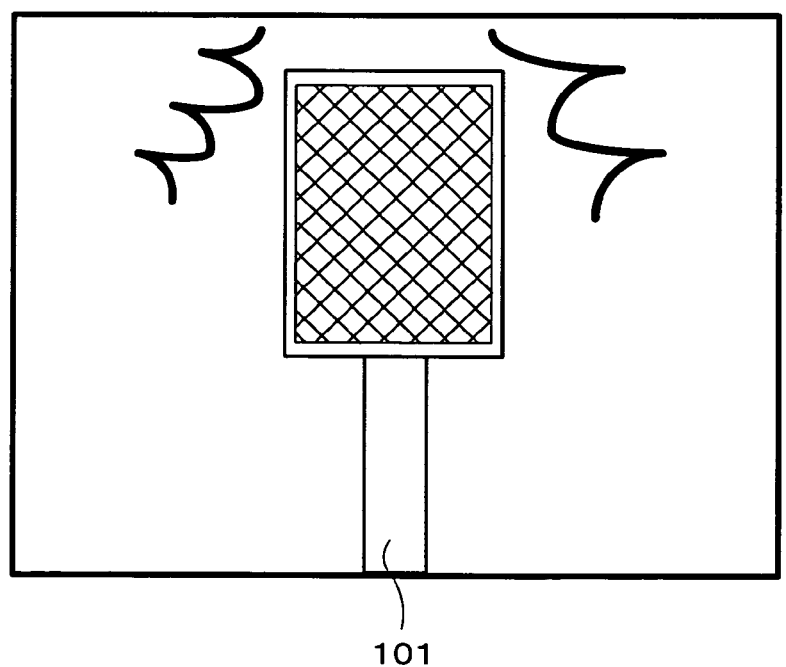
FIG. 15 shows an exemplary game screen displayable in this embodiment.

Next, as shown in FIG. 13, the player swings down his/her hand in the opposite motion to the above. Namely, the player performs a motion of swatting down the fly 102 as if the controller 7 was the fly swatter 101. Then, as shown in FIG. 14 and FIG. 15, the fly swatter 101 hits the wall. When the fly swatter 101 hits the wall while the fly 102 is on the wall, the player can swat and kill the fly 102.

In this game, fundamentally, the fly swatter 101 in the game screen is drawn as being swung up and down in accordance with the speed at which the player's hand moves. Therefore, when the player performs the motion of swinging up and down the hand slowly, the fly swatter 101 moves slowly. In this case, the motion of the fly swatter 101 is not vigorous enough to kill the fly 102 even if the fly swatter 101 hits the fly 102. When the controller 7 is swung down at a vigor (i.e., with an acceleration applied on the controller 7) exceeding a predetermined level, the fly swatter 101 is drawn as being swung down at a calculated inclining angle regardless of the speed at which the player's hand holding the controller 7 actually moves. Namely, in the game screen, the fly swatter 101 is drawn as being swung down at a predetermined speed regardless of the actual acceleration (hereinafter, this motion will be referred to as "automatic swatting motion").

As described above, in this game, the player actually swings up and vigorously swings down the controller 7 as if the controller 7 was the fly swatter 101, so as to swat and kill the fly 102 in the game screen. When the speed at which the controller 7 is swung down exceeds the predetermined value, the fly swatter 101 is drawn in the game screen as being swung down at a predetermined speed by an automatic swatting motion, regardless of the actual speed at which the controller 7 is swung down. If the fly swatter 101 was drawn as being swung down at a speed in accordance with the actual acceleration, the change in the acceleration might be too large and the fly swatter 101 might be drawn as being instantaneously moved. This presents unnaturalness to the player. In order to avoid this, when it is detected that the controller 7 has been swung down at a vigor of a certain level, the fly swatter 101 is drawn as being swung down in a smooth motion without unnaturalness.

Figure 16:
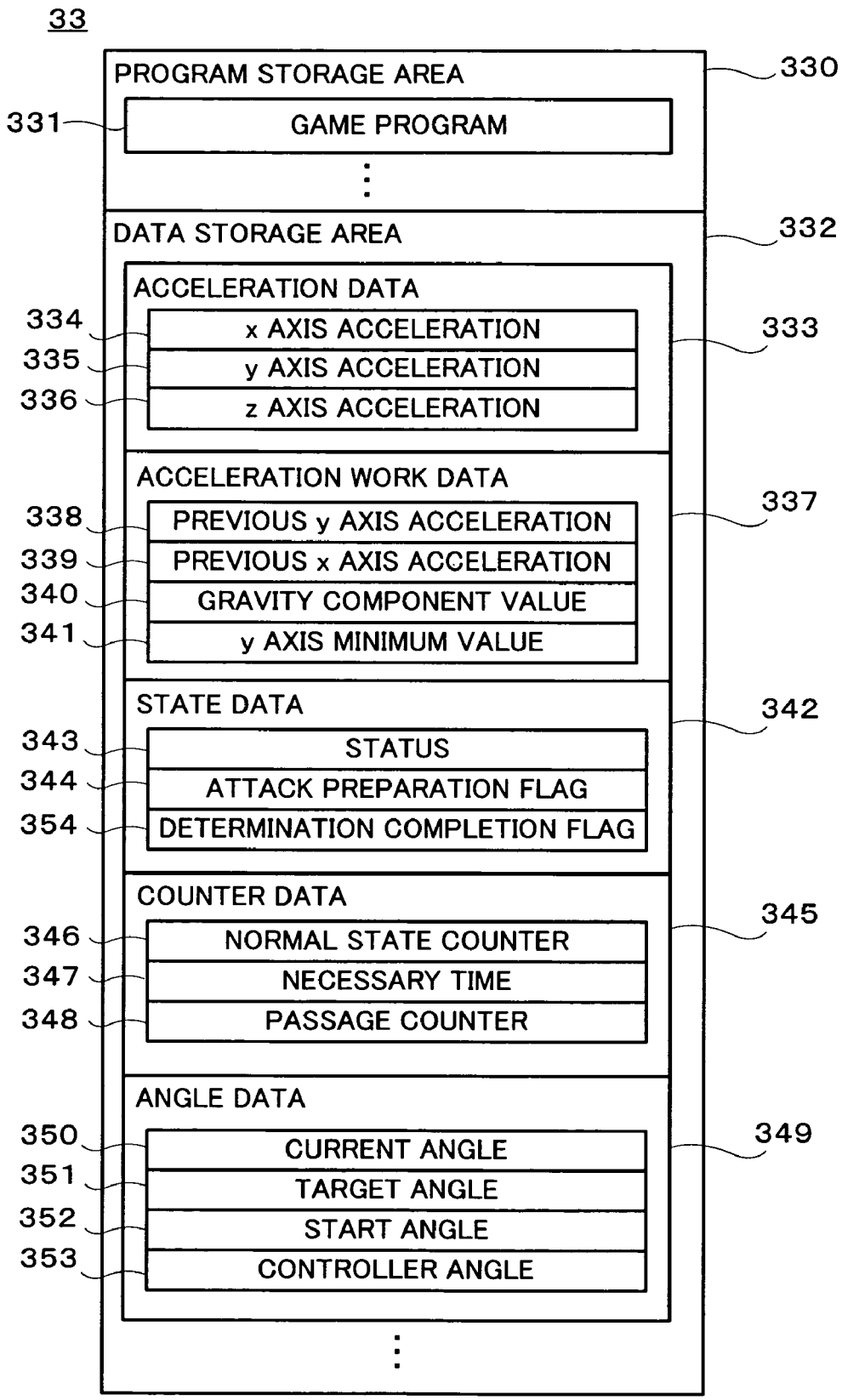
FIG. 16 shows a memory map of a main memory 33 shown in FIG. 2.

Now, game processing executable by the game system 1 will be described in detail. First, data stored on the main memory 33 for the game processing will be described. FIG. 16 shows a memory map of the main memory 33 shown in FIG. 2. As shown in FIG. 16, the main memory 33 includes a game program storage area 330 and a data storage area 332.

The game program storage area 330 includes, for example, a game program 331 to be executed by the CPU 30.

The data storage area 332 includes acceleration data 333, acceleration work data 337, state data 342, counter data 345, angle data 349 and the like. The main memory 33 includes data regarding the virtual game space (image data, etc.) and other data required for the game processing in addition to the information shown in FIG. 16.

The acceleration data 333 is included in a series of operation information which is transmitted from the controller 7 as transmission data. As the acceleration data 333, acceleration data corresponding to a predetermined number of frames (for example, 30 frames) is stored. One frame (1/60 seconds) is the game processing interval. The acceleration data 333 includes an x axis acceleration 334, a y axis acceleration 335 and a z axis acceleration 336, which are respectively detected by the acceleration sensor 701 regarding the x, y and z axes of the controller 7. The communication unit 6 receives the acceleration data 333 included in the operation information which is transmitted from the controller 7 at a predetermined interval (for example, every 5 ms), and accumulates the acceleration data 333 in a buffer (not shown) thereof. Then, the acceleration data 333 is read at an interval of one frame (game processing interval) and stored on the main memory 33. The acceleration data 333 has a value in the range of −2G to +2G.

The acceleration work data 337 includes a previous y axis acceleration 338, a previous z axis acceleration 339, a gravity component value 340, and a y axis minimum value 341. The previous y axis acceleration 338 is a y axis acceleration obtained by the processing in the immediately previous frame. As described above, the game processing interval of this game is one frame (1/60 seconds). The previous z axis acceleration 339 is a z axis acceleration obtained by the processing in the immediately previous frame. The gravity component value 340 is a z axis acceleration obtained when the controller 7 is in a still state, and represents a z axis direction component of the gravitational acceleration applied on the controller 7 in such a state. The y axis minimum value 341 is the minimum value among the y axis acceleration values obtained during the processing in this embodiment.

The state data 342 includes a status 343, an attack preparation flag 344, and a determination completion flag 354. The status 343 represents the motion state of the fly swatter 101. In this game, there are four types of "states": (1) swing up; (2) swing down; (3) reaction; and (4) normal.

The "swing up" state refers to a motion of the fly swatter 101 of being swung up. The "swing down" state refers to a motion of the fly swatter 101 of being swung down. The "reaction" state refers to a state of the fly swatter 101 when the swing up motion or the swing down motion of the fly swatter 101 is completed. At the moment the controller 7 is stopped after being swung up, an acceleration is applied to the controller 7 by the reaction. Similarly, at the moment the controller 7 is stopped after being swung down, an acceleration is applied to the controller 7 by the reaction. The state where the acceleration is detected is referred to as the "reaction" state. The "normal" state refers to a state other than the above-mentioned three states, i.e., the state where the fly swatter 101 is immobile (including a state where the fly swatter 101 is very slightly moving but can be regarded as immobile).

The attack preparation flag 344 is a flag indicating, when the status 343 represents the "swing up" state, whether or not the acceleration data 333 represents the motion of swinging down. Namely, the attack preparation flag 344 indicates whether or not the fly swatter 101, which is swung up, is immediately swung down to swat the flag 102. The determination completion flag 354 indicates whether the game processing is determined to be terminated or not.

The counter data 345 includes a normal state counter 346, a necessary time 347, and a passage counter 348. The normal state counter 346 counts the time (the number of frames) in which the "normal" state continues. The necessary time 347 refers to a time period necessary for the automatic swatting motion and is represented with a number of frames (i.e., the number of times that the processing loop is repeated). The passage counter 348 represents a change of the number of frames (the number of times that the processing loop is repeated) during the automatic swatting motion of the fly swatter 101 described above.

The angle data 349 includes a current angle 350, a target angle 351, a start angle 352, and a controller angle 353. The current angle 350 represents the current inclination angle of the fly swatter 101 in the game space. In this game, the angle when the controller 7 is in a horizontal state (FIG. 9) is 0 degrees. The angle when the controller 7 is swung up (FIG. 10) is 105 degrees at the maximum. Even when the controller 7 is inclined at an angle over 105 degrees, such an angle is treated as 105 degrees in the game. The angle when the controller 7 is swung down (FIG. 13) is 0 degrees at the minimum. Even when the controller 7 is inclined at an angle lower than 0 degrees, such an angle is treated as 0 degrees in the game. The target angle 351 is an angle to which the fly swatter 101 is to be inclined. The start angle 352 is an angle of the fly swatter 101 when the automatic swatting motion is started. The controller angle 353 represents an inclination angle of the controller 7.

Figure 17:
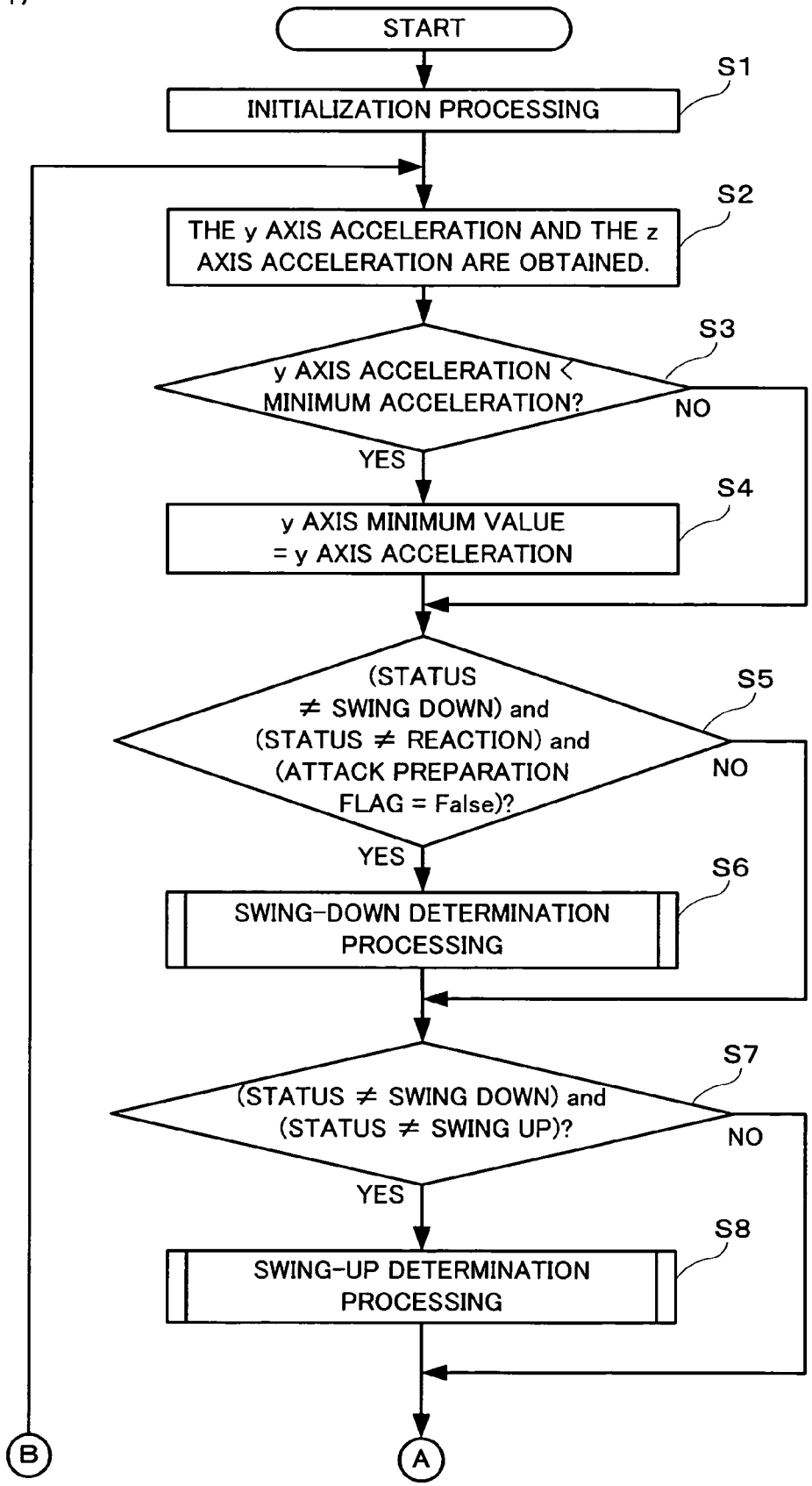
FIG. 17 is a flowchart illustrating game processing in this embodiment.
Figure 18:
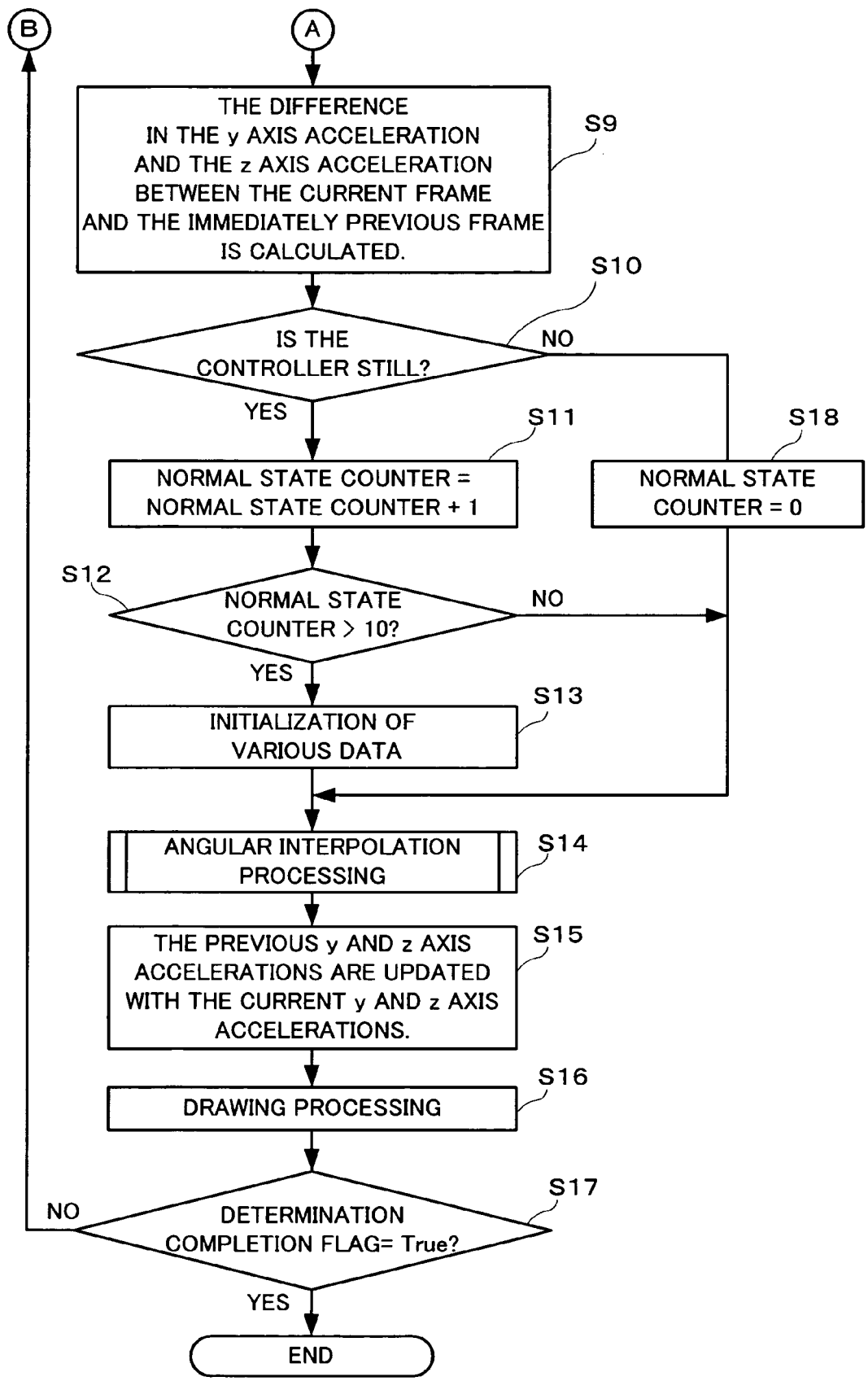
FIG. 18 is a flowchart illustrating the game processing in this embodiment.

With reference to FIG. 17 through FIG. 22, the game processing to be executed by the game apparatus main body 3 will be described. FIG. 17 is a flowchart illustrating the overall game processing executed by the game apparatus main body 3. The processing loop in steps S2 through S17 shown in FIG. 17 and FIG. 18 is repeated frame by frame.

Referring to FIG. 17, the CPU 30 executes initialization processing of initializing various data (step S1). Specifically, the CPU 30 performs initialization by setting the following values. The status 343 is set to "normal". The attack preparation flag 344 is set to a value "False". The passage counter 348, the gravity component value 340 and the previous z axis acceleration 339 are each set to −1. The necessary time 347, the start angle 352, and the normal state counter 346 are each set to 0. The previous y axis acceleration 338 is set to −0.5. The y axis minimum value 341 is set to 1. The current angle 350 is set to 105 degrees.

Next, the CPU 30 obtains the y axis acceleration 335 and the z axis acceleration 336 (step S2). At this point, a gravity component is removed from the obtained z axis acceleration 336. Specifically, the CPU 30 calculates a value obtained by subtracting the gravity component value 340 from the z axis acceleration 336. Hereinafter, the value thus obtained will be referred to as a "net z axis acceleration." The z axis acceleration 336 may be used without being processed (namely, without removing the gravity component). In this case, in step S21 described later, (net z axis acceleration>1.025 G) may be replaced with (z axis acceleration 336>0.025 G). Alternatively, a gravity component may be removed from the obtained y axis acceleration 335. For this purpose, the following may be performed. A data area for "gravity component (y)" is obtained in the main memory 33. In step S13 described later, the obtained y axis acceleration 335 is stored in the "gravity component (y)" area. In step S21 described later, (y axis minimum value>−1.025 G) is replaced with (net y axis acceleration minimum value>−1.025 G), where the net y axis acceleration is a value obtained by subtracting the "gravity component (y)" from the obtained y axis acceleration 335 in step S2.

Next, the CPU 30 calculates the y axis minimum value 341. Specifically, the CPU 30 compares the y axis acceleration 335 with the y axis minimum value 341, and determines whether or not the y axis acceleration 335 is less than the y axis minimum value 341 (step S3). When the y axis acceleration 335 is less than the y axis minimum value 341 (YES in step S3), the y axis minimum value 341 is updated with the value of the y axis acceleration 335 (step S4). When the y axis acceleration 335 is not less than the y axis minimum value 341 (NO in step S3), the processing is advanced to the next step without any updating.

Next, the CPU 30 determines whether or not the following condition is fulfilled (step S5).

(status343≠"swing down")AND(status 343≠"reaction")AND(attack preparation flag 344=False)

When the condition is determined to be fulfilled (YES in step S5), the CPU 30 executes swing-down determination processing (step S6). Namely, in the condition that the status 343 represents the "normal" or "swing up" state and the acceleration data does not indicate that the controller 7 is swung down immediately after being swung up, the swing-down determination processing is executed.

Figure 19:
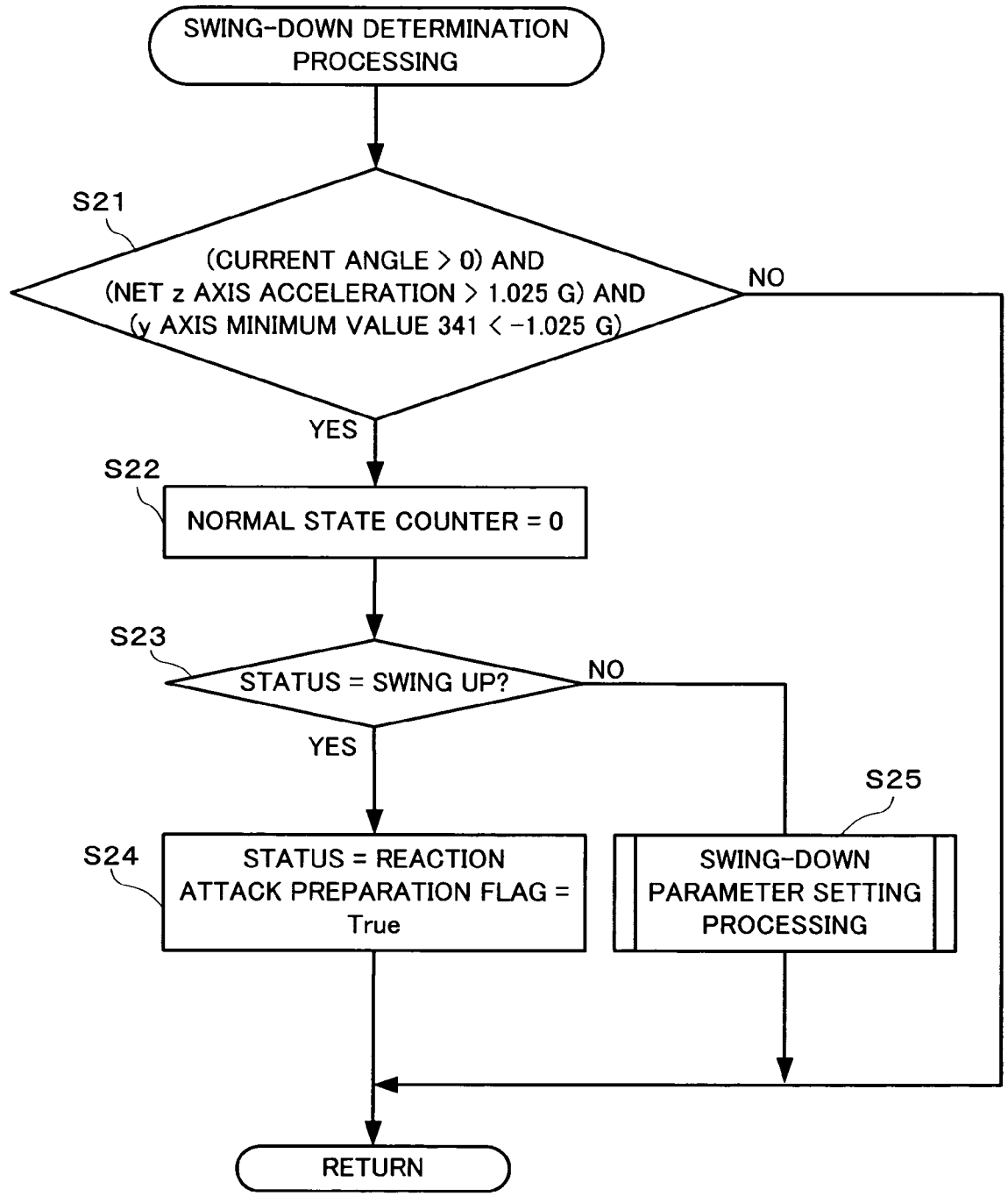
FIG. 19 is flowchart illustrating swing-down determination processing in step S6 in FIG. 17 in detail.

FIG. 19 is a flowchart illustrating the swing-down determination processing in step S6 in detail. Referring to FIG. 19, the CPU 30 first determines whether or not the following condition is fulfilled in order to determine the strength at which, and the direction in which, the controller 7 has been swung (step S21).

(current angle 350>0)AND(net z axis acceleration>1.025 G)AND(y axis minimum value 341<−1.025 G)

The value of 1.025 G is one example of the value which represents an acceleration considered to be sufficient to kill the fly 102 in the virtual game world. When the condition is determined not to be fulfilled (NO in step S21), the swing-down determination processing is terminated. When the condition is determined to be fulfilled, (YES in step S21), the CPU 30 sets the normal state counter 346 to 0 (step S22).

Next, the CPU 30 determines whether or not the status 343 represents the "swing up" state (step S23). This determination is conducted in order to determine whether or not the controller 7 is in the "reaction" state, in which an opposite acceleration is applied to the controller 7 while the controller 7 is swinging up (the state where the controller 7 is swung up and the stopped). When the status 343 is determined to represent the "swing up" state (YES in step S23), it is considered that the opposite acceleration is applied to the controller 7 while the controller 7 is swinging up. Thus, the CPU 30 sets the status 343 to "reaction". In this state, the "swing up" operation of the controller 7 has been completed. Therefore, the CPU 30 sets the attack preparation flag 344 to "True" (step S24).

When the status 343 is determined not to represent the "swing up" state (NO in step S23), the CPU 30 executes swing-down parameter setting processing (step S25). The swing-down parameter setting processing in step S25 corresponds to the motion of the controller 7 (fly swatter 101) of being swung up, stopped, and vigorously swung down. (As described later, when the controller 7 is stopped for a certain period after being swung up, the status 343 is set to "normal" in step S13.) Thus, the swing-down determination processing is terminated.

Figure 20:
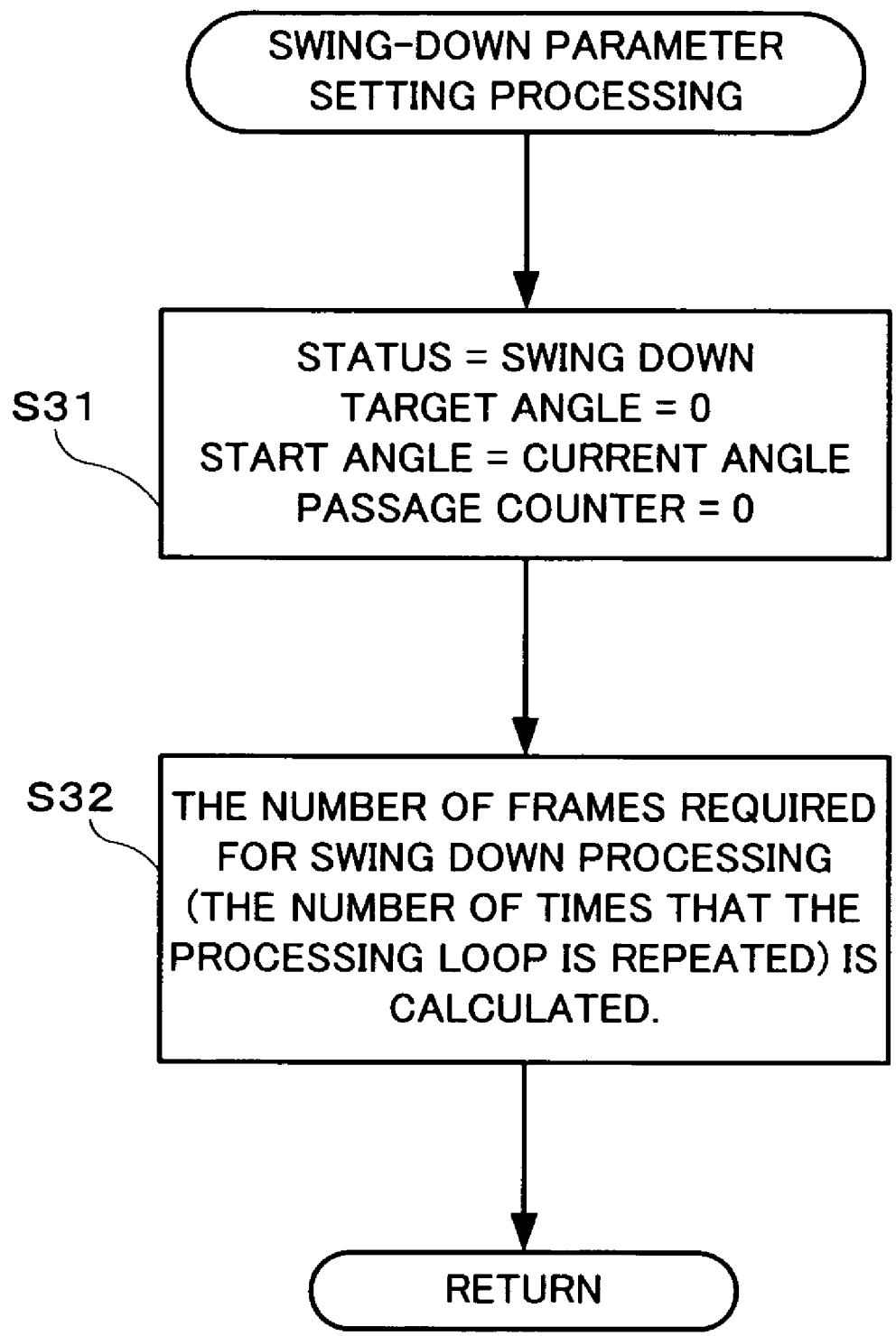
FIG. 20 is flowchart illustrating swing-down parameter setting processing in step S25 in FIG. 19 in detail.

FIG. 20 is a flowchart illustrating the swing-down parameter setting processing in step S25 in detail. Referring to FIG. 20, the CPU 30 sets various variables (step S31). Specifically, the status 343 is set to "swing down". The target angle 351 and the passage counter 348 are each set to 0. The start angle 352 is set to the value of the current angle 350.

Next, the CPU 30 calculates the necessary time 347, i.e., the number of frames required to draw the automatic swatting motion (the number of times that the processing loop in steps S2 through S17 in FIG. 17 and FIG. 18 is repeated) (step S32). Specifically, the CPU 30 calculates variable Frame, which is a value obtained by performing predetermined linear interpolation on the y axis minimum value 341. For example, when the y axis minimum value 341 is −1.268, variable Frame is 2.0; and when the y axis minimum value 341 is −1.025, variable Frame is 8.0. When the y axis minimum value 341 is in the range of −1.268 to −1.025, the y axis minimum value 341+1.268: −1.025+1.268=Frame−2.0:8.0−2.0. Therefore, variable Frame is calculated from Frame=2.0+(y axis minimum value 341+1.268)÷(−1.025+1.268)×6.0. When the y axis minimum value 341 is smaller than −1.268, the y axis minimum value 341 is treated as −1.268. When the y axis minimum value 341 is larger than −1.025, the y axis minimum value 341 is treated as −1.025. Next, the current angle 350, which is in the range of −0 to 105 degrees, is converted to be represented with a value in the range of 0 to 1. When the current angle 350 is 0 degrees, the controller 7 is in the horizontal state; and when the current angle 350 is 105 degrees, the controller 7 is swung up. The converted value of the current angle 350 is referred to as "variable Mag". Namely, the value corresponding to the current angle of the controller 7 while the inclination angle of the controller 7 is changed from 0 degrees to 105 degrees, the value being 0 when the inclination angle of the controller 7 is 0 degrees and being 1 when the inclination angle of the controller 7 is 105 degrees, is Mag. When the inclination angle of the controller 7 is in the range of 0 degrees to 105 degrees, the inclination angle of the controller 7: 105 degrees=Mag: 1.0. Therefore, variable Mag is obtained from Mag=the inclination angle of the controller 7÷105. When the inclination angle of the controller 7 is smaller than 0 degrees, such an angle is treated as 0 degrees; and when the inclination angle of the controller 7 is larger than 105 degrees, such an angle is treated as 105 degrees. A value obtained by Frame×Mag is the necessary time 347, i.e., the number of frames required to draw the automatic swatting motion. Thus, the swing-down parameter setting processing is terminated.

Returning to FIG. 17, after the swing-down determination processing, the CPU 30 determines whether or not the status 343 fulfills the following condition (step S7).

(Status 343≠swing down)AND(status≠swing up)

When the condition is fulfilled (YES in step S7), the CPU 30 executes swing-up determination processing (step S8). Namely, when the status 343 represents the "normal" or "reaction" state, the swing-up determination processing is executed.

Figure 21:
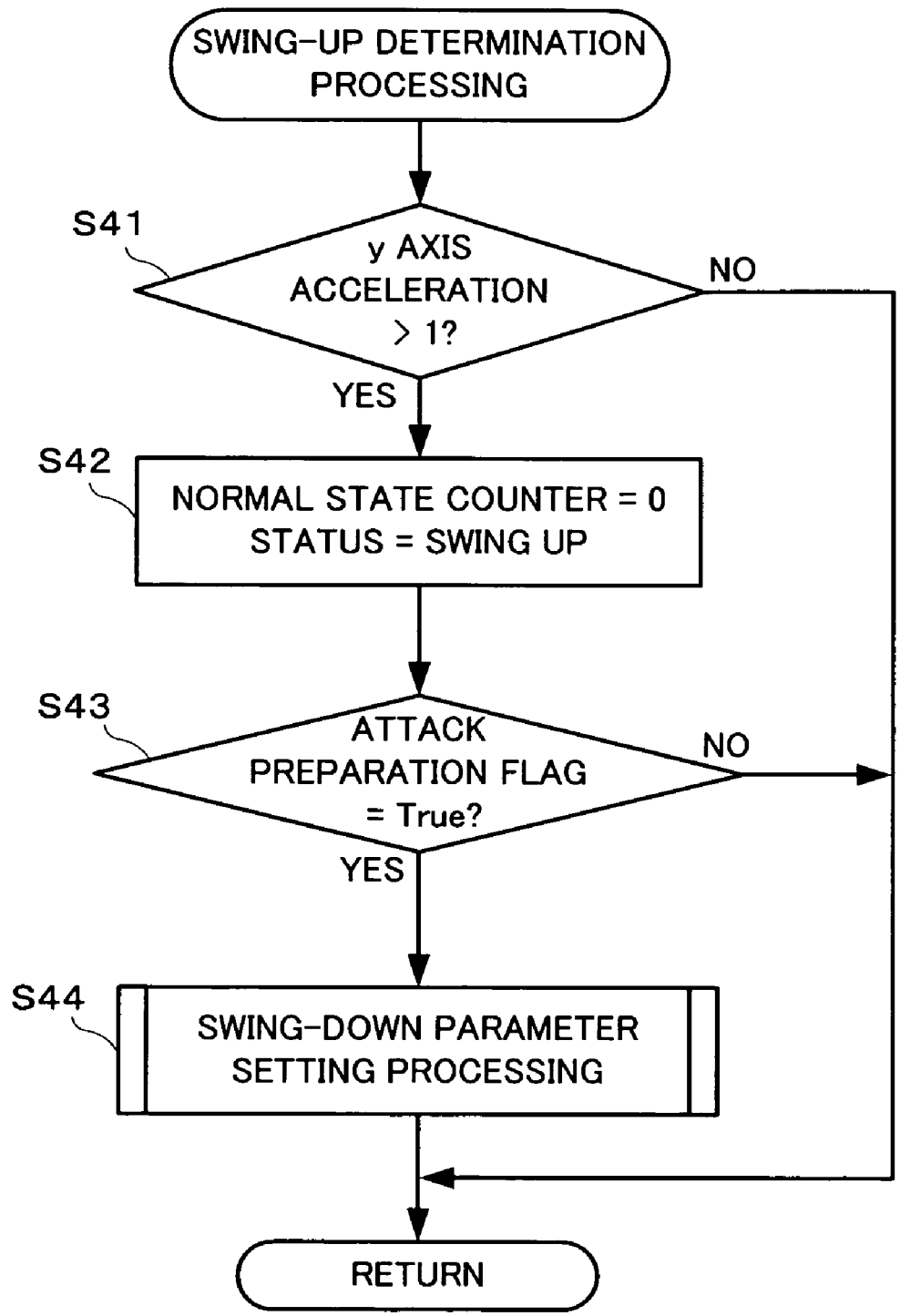
FIG. 21 is flowchart illustrating swing-up determination processing in step S8 in FIG. 17 in detail.

FIG. 21 is a flowchart illustrating the swing-up determination processing in step S8 in detail. Referring to FIG. 21, the CPU 30 determines whether the y axis acceleration 355 is larger than 1 (step S41). This determination is conducted in order to determine whether or not the controller 7 is moving upward, or whether or not the speed of the controller 7 moving downward is decreasing. When the y axis acceleration 355 is equal to or less than 1 (NO in step S41), the swing-up determination processing is terminated. When the y axis acceleration 355 is larger than 1 (YES in step S41), the CPU 30 sets the normal state counter 346 to 0. The CPU 30 also sets the status 343 to "swing up" (step S42).

Next, the CPU 30 determines whether or not the attack preparation flag 344 is True (step S43). When the attack preparation flag 344 is determined to be True (YES in step S43), this means that the controller 7 is swung down and stopped, namely, the controller 7 has been completely swung down. In this case, the swing-down parameter setting processing described above is executed (step S44). Unlike the parameter setting processing in step S25, the processing in step S44 corresponds to a motion of the controller 7 (fly swatter 101) of being swung up and immediately swung down without being stopped (swung down before the status 343 is changed to "normal"). Thus, the swing-up determination processing is terminated.

After the swing-up determination processing in FIG. 17, the CPU 30 obtains a difference in the y axis acceleration and the z axis acceleration between the current processing loop and the immediately previous processing loop (step S9 in FIG. 18). More specifically, an absolute value of the y axis acceleration 335, YAbs, and an absolute value of the z axis acceleration 336, ZAbs, are first calculated. Then, a difference YS between YAbs and an absolute value of the previous y axis acceleration 338 is obtained. Similarly, a difference ZS between ZAbs and an absolute value of the previous z axis acceleration 339 is obtained.

Next, the CPU 30 determines whether or not the controller 7 can be regarded as being still while being within a certain range of inclination thereof (i.e., whether or not the player's hand holding the controller 7 is substantially still) (step S10). Specifically, the CPU 30 determines whether or not the following condition is fulfilled.

(YAbs<1 AND ZAbs<1)AND(current angle 350>60 degrees)AND((YS<0.2 G AND ZS<0.2 G)OR (current angle 350>90 degrees))

(YAbs<1 AND ZAbs<1) is provided for eliminating a movement at a uniform speed. (YS<0.2 G AND ZS<0.2 G) is provided for determining whether or not the acceleration is larger than in the immediately previous frame.

When the above condition is determined not to be fulfilled (NO in step S10), the normal state counter 346 is set to 0 (step S18) and the processing is advanced to step S14. When the above condition is determined to be fulfilled (YES in step S10), the value of the normal state counter 346 is incremented by "1" (step S11). Next, the CPU 30 determines whether or not the value of the normal state counter 346 is equal to or larger than 10 frames (step S12). When it is determined that the normal state has continued for 10 frame or longer (YES in step S12), the CPU 30 initializes various data as follows (step S13). The attack preparation flag 344 is set to False. The status 343 is set to "normal". The gravity component value 340 is set to the value of the z axis acceleration 336. The y axis minimum value 341 is set to the value of the y axis acceleration 335. The normal state counter 346 is set to 0.

Next, the CPU 30 executes angular interpolation processing (step S14). Specifically, when the status 343 represents the "swing down" state, the inclination angle of the fly swatter 101 which is to be drawn the next time is obtained based on the relationship between the necessary time 347 and the passage counter 348. When the status 343 does not represent the "swing down" state, the inclination of the controller 7 is calculated from the y axis acceleration 335 and the z axis acceleration 336. In accordance with the inclination, the inclination angle of the fly swatter 101 which is to be drawn the next time is calculated. Namely, the inclination angle of the fly swatter 101 is obtained in accordance with the inclination of the controller 7.

Figure 22:
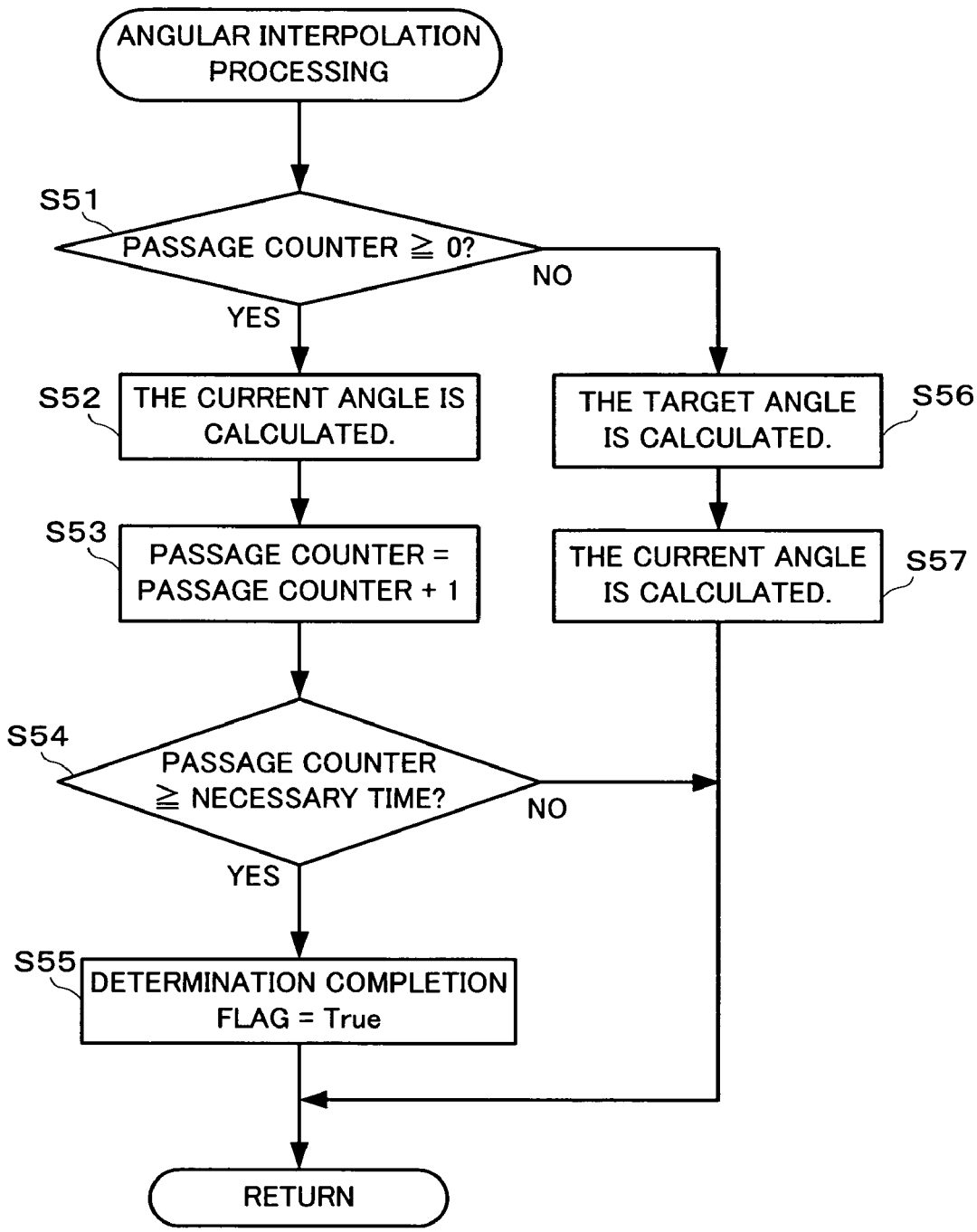
FIG. 22 is flowchart illustrating angular interpolation processing in step S14 in FIG. 18 in detail.

FIG. 22 is a flowchart illustrating the angular interpolation processing in step S14 in detail. Referring to FIG. 22, the CPU 30 determines whether or not the value of the passage counter 348 is equal to or larger than 0 (step S51) (the passage counter 348 is set to −1 as an initial value in step S1). When the value of the passage counter 348 is equal to or larger than 0 (YES in step S51), the range from 0 to the number of frames represented by the necessary time 347 is converted into the range from the start angle 352 to the target angle 351, so as to calculate an angle in accordance with the value of the passage counter 348 (current angle 350) (step S52). Specifically, 0 is associated with the start angle 352, and the necessary time 347 is associated with the target angle 351. Then, the point in the range from the start angle 352 to the target angle 351 at which the current value of the passage counter 348 is located is calculated. In this embodiment, such a point is calculated by executing, for example, linear interpolation of converting a value in the range from 0 to the necessary time 347 into a value in the range from the start angle 352 to the target angle 351. Specifically, when the value of the passage counter 348 is in the range from 0 to the necessary time 347, the passage counter 348: necessary time 347=current angle 350–start angle 352: target angle 351–start angle 352. Therefore, the current angle 350 is calculated from current angle 350=passage counter 348×(target angle 351–start angle 352)÷necessary time 347. The obtained value is rounded so as to be within the range of 0 to 105 degrees. Specifically, any value exceeding 105 degrees is converted into 105 degrees, and any value smaller than 0 degrees is converted into 0 degrees. Thus, an angle in accordance with the value of the passage counter 348 in the current frame is set as the inclination angle of the fly swatter 101 which is to be drawn the next time (the angle of the fly swatter 101 drawn in step S16 described later), i.e., the current angle 350.

Next, the CPU 30 increments the value of the passage counter 348 by "1" (step S53). The CPU 30 determines whether or not the value of the passage counter 348 is equal to or larger than the value of the necessary time 347 (step S54). When the value of the passage counter 348 is determined to be equal to or larger than the value of the necessary time 347 (YES in step S54), this means that the automatic swatting motion is completed. Therefore, the CPU 30 sets the determination completion flag 354 to True (step S55). When the value of the passage counter 348 is determined not to be equal to or larger than the value of the necessary time 347 (NO in step S54), the angular interpolation processing is terminated without any setting.

When it is determined in step S51 that the value of the passage counter 348 is less than 0 (NO in step S51), the inclination angle of the fly swatter 101 which is to be drawn the next time (i.e., the current angle 350) is calculated based on the y axis acceleration 335 and the z axis acceleration 336 obtained from the controller 7. The acceleration values are not reflected as they are, but the inclination angle of the fly swatter 101 to be drawn the next time is adjusted such that the movement of the fly swatter 101 appears smooth in the game screen. Specifically, the following processing is executed. Based on the current acceleration, the inclination angle of the fly swatter 101 to be drawn the next time is calculated as the target angle 351 (step S56). The target angle 351 is obtained by, for example, calculating the angle of the controller 7 based on the y axis acceleration 335 and the z axis acceleration 336 using inverse tangent function. In other words, the current inclination angle of the controller 7 is temporarily set as the target angle 351. When the angle of the controller 7 calculated based on the y axis acceleration 335 and the z axis acceleration 336 is smaller than 0 degrees, the target angle 351 is set to 0 degrees. When such an angle is larger than 105 degrees, the target angle 351 is set to 105 degrees.

Next, the inclination angle of the fly swatter 101 to be drawn the next time is adjusted as described above, so as to calculate the current angle 350 (step S57). This is conducted as follows, for example. First, a difference S between the current angle 350 and the target angle 351 calculated above is obtained. Then, predetermined linear interpolation is performed on the difference S, and the resultant value is obtained as an adjustment value T. For example, linear interpolation is performed such that a value in the range of PI/2 to PI (PI: the ratio of the circumference of a circle to the diameter thereof) is converted into a value in the range of 6.0 to 4.0 so as to obtain the adjustment value T. Specifically, when the current angle 350 is in the range of PI/2 to PI, PI/2–PI: current angle 350–PI=2.0: adjustment value T–4.0. Therefore, the adjustment value T is obtained from adjustment value T=4.0–(current angle 350–PI)÷PI×4.0. The current angle 350 is updated by the following expression.

Current angle 350=current angle 350+(S/T)

It is assumed here, for example, that the current angle 350 (the angle in the drawing in the immediately previous frame) is calculated to be 90 degrees and the target angle is calculated to be 95 degrees. In this case, the difference is 5, and the fly swatter 101 would be drawn at an inclination angle of 95 degrees the next time without any adjustment. By the above-described adjustment, however, the fly swatter 101 is drawn at an inclination angle of, for example, 91 degrees. Therefore, the fly swatter 101 in a normal state (with no vigorous movement) is represented as moving smoothly. In addition, even if the fly swatter 101 is slightly moved due to the instability of the hand or the like, such a slight motion is not reflected on the display in the screen. If the player's hand which moves slightly due to the instability was reflected on the display in the screen, the fly swatter 101 would drawn as moving slightly. The above-described adjustment allows the fly swatter 101 to be drawn in a substantially still state.

Returning to FIG. 18, after the angular interpolation processing, the CPU 30 updates the previous y axis acceleration 338 with the y axis acceleration 335, and also updates the previous z axis acceleration 339 with the z axis acceleration 336 (step S15). Then in step S16, drawing processing is executed, by which an image, taken by a virtual camera, of the fly swatter 101 inclined at an angle represented as the current angle 350 is displayed on the monitor 2 as a game image.

Next, the CPU 30 determines whether or not the determination completion flag 352 is True (step S17). When the determination completion flag 352 is not True (NO in step S17), the processing is returned to step S2 and the above-described processing is repeated. When the determination completion flag 352 is True (YES in step S17), the CPU 30 terminates the game processing. Thus, the game processing in this embodiment is terminated.

As described above, in this embodiment, when the controller 7 is swung down with a vigor (acceleration) exceeding a certain level, the inclination angle of the fly swatter 101 is calculated in each frame. The fly swatter 101 is not drawn at an inclination angle based on the acceleration obtained in each frame. Therefore, even when the acceleration applied to the controller 7 drastically changes, the fly swatter 101 is drawn as being swung smoothly. This prevents unnaturalness from being presented to the player. Namely, the unnaturalness given to the player if the fly swatter 101 was drawn so as to reflect the actual acceleration can be avoided. The fly swatter 101 (the object in the virtual game space) can be moved naturally as the player intends. Therefore, even when the input device is moved vigorously, the object in the game space is drawn as moving naturally. Thus, the game is kept amusing and entertaining.

In a normal state, the inclination angle of the fly swatter 101 in the next drawing is adjusted. Thus, the movement of the fly swatter 101 is displayed smoothly. The slight movement of the controller 7 due to the instability of the player's hand or the like is not reflected on the display in the screen, so that the fly swatter 101 is displayed as substantially being still. Thus, the object is represented as moving smoothly as the player intends.

In the above embodiment, in the swing-down determination processing in step S6, the z axis acceleration (strength of the swing) and the y axis minimum value 341 (direction of the swing) are both used in step S21 (FIG. 19). Alternatively, either one of them may be used. In this case, the processing load can be reduced because the determination is made regarding one axial direction although the detection precision on the motion of the controller 7 is slightly lowered. This is useful for a game in which it is not necessary to grasp the motion of the controller 7 precisely.

In step S56 in the angular interpolation processing in FIG. 22 also, either one of the y axis acceleration or the z axis acceleration may be used to calculate the target angle 351, instead of using both. In the case where the swing-down determination processing uses only the z axis acceleration, only the z axis acceleration may be used also in step S56 to calculate the inclination of the controller 7, the target angle 351 and the current angle 350. In this case also, the processing load is reduced because the determination is made regarding one axial direction.

While certain example embodiments of the invention have been described in detail, the foregoing description is in all aspects illustrative and not restrictive. It is understood that numerous other modifications and variations can be devised without departing from the scope of the invention.

What is claimed is:

1. A non-transitory storage medium having stored thereon a game program executable by a computer of a game apparatus capable of using a value detected by an acceleration sensor provided in an input device for detecting accelerations in at least two directions, the game program causing the computer to execute:
   obtaining first acceleration data representing an acceleration in a first direction of the input device;
   obtaining second acceleration data representing an acceleration in a second direction of the input device which is different from the first direction;
   determining whether or not the first acceleration data is smaller than a first threshold value;
   when the first acceleration data is smaller than the first threshold value, executing predetermined calculation processing at least based on the second acceleration data to execute first setting processing of calculating a first parameter;
   when the first acceleration data is not smaller than the first threshold value, executing a second predetermined process, the second predetermined process including setting the first parameter to a predetermined value; and
   executing a game process, including animating a movement of a virtual object, based on the first parameter,
   wherein the predetermined value is a predetermined inclination value.

2. A storage medium according to claim 1, wherein:
   the game instructs a player to perform an operation of inclining the input device;
   the first direction is a direction in which, when the player performs the operation of inclining the input device, a centrifugal force is generated; and
   the second direction is a direction in which, when the player performs the operation of inclining the input device, an acceleration is generated by a force of the operation.

3. A storage medium according to claim 1, wherein:
   the game instructs a player to perform an operation of inclining the input device;
   the first direction is a direction which, when the player performs the operation of inclining the input device, perpendicularly crosses an arc which is a trajectory of a movement of a predetermined position in the input device made by the operation; and
   the second direction is a direction which, when the player performs the operation of inclining the input device, is a tangent direction to the arc.

4. A storage medium according to claim 1, wherein:
   the first setting processing calculates the first parameter based on another predetermined value when a value calculated by the predetermined calculation processing based on the second acceleration data is outside a predetermined range; and
   wherein the predetermined value is a border value of the predetermined range or a value outside the predetermined range.

5. A storage medium according to claim 4, wherein the predetermined calculation processing causes the first parameter to change in one way in accordance with an increase in the second acceleration data.

6. A storage medium according to claim 1, wherein:
   the game instructs a player to perform an operation of inclining the input device so as to keep the first direction and the second direction in a vertical plane and so as to cause an inclination of the first direction with respect to a gravity direction is in a predetermined range; and
   the first threshold value is larger than a maximum value of a gravitational acceleration generated in the first direction when the input device is inclined within the predetermined range.

7. A storage medium according to claim 1, wherein:
   the game program causes the computer to further execute removing a gravity component applied in the first direction from the obtained first acceleration data before determining whether or not the first acceleration data is smaller than the first threshold value.

8. A storage medium according to claim 7, wherein:
   the game program causes the computer to further execute:
   calculating difference data between a first obtained acceleration data of a current time and a second obtained first acceleration data of a previous time, and/or difference data between the a first obtained second acceleration data of the current time and a second obtained second acceleration data of a previous time;
   at least when the difference data does not satisfy a difference condition, storing the first obtained acceleration data of the current time; and
   subtracting stored data from the first obtained acceleration data of the current time.

9. A storage medium according to claim 1, wherein:
   the first setting processing includes:
   calculating angle data representing an angle of the input device with respect to a gravity direction based on at least the second acceleration data,
   setting the first parameter based on the angle data,
   setting the first parameter to a second predetermined value when the angle data represents an angle outside a predetermined range; and
   the first threshold value is larger than a maximum value of a gravitational acceleration generated in the first direction when the input device is inclined within the predetermined range.

10. A storage medium according to claim 1, wherein:
    the second predetermined process is executed when the second acceleration data satisfies a second condition and the first acceleration is smaller than the first threshold value.

11. A storage medium according to claim 10, wherein:
    the game instructs a player to perform an operation of inclining the input device so as to keep the first direction and the second direction in a vertical plane and so as to cause an inclination of the first direction with respect to a gravity direction is in a predetermined range; and wherein the second condition includes a the second threshold value that is larger than a maximum value of a gravitational acceleration generated in the second direction when the input device is inclined within the predetermined range.

12. A storage medium according to claim 10, wherein: the predetermined calculation processing causes the first parameter to increase in one way in accordance with an increase in the second acceleration data;

the first setting processing sets the first parameter to a second predetermined value when a value calculated by the predetermined calculation processing based on the second acceleration data is larger than the second predetermined value; and the predetermined value is the predetermined value or another value larger than the predetermined value.

13. A storage medium according to claim 10, wherein: the predetermined calculation processing causes the first parameter to decrease in one way in accordance with an increase in the second acceleration data;

the first setting processing sets the first parameter to a second predetermined value when a value calculated by the predetermined calculation processing based on the second acceleration data is smaller than the second predetermined value; and the predetermined value is the predetermined value or another value smaller than the predetermined value.

14. A storage medium according to claim 10, wherein: the game program causes the computer to further execute storing a history of the obtained second acceleration data in a non-transitory storage medium; and a maximum data of the stored second acceleration data is the second acceleration data, and the second condition is the maximum data being larger than a second threshold value.

15. A storage medium according to claim 1, wherein the first setting processing calculates the first parameter by executing predetermined calculation processing based on at least the first acceleration data and the second acceleration data.

16. A storage medium according to claim 15, wherein the predetermined calculation processing calculates angle data representing an angle of the input device with respect to a gravity direction as the first parameter based on at least the first acceleration data and the second acceleration data.

17. A storage medium according to claim 16, wherein the predetermined calculation processing uses the first acceleration data and the second acceleration data for an inverse tangent function.

18. A storage medium according to claim 16, wherein: the first setting processing calculates the first parameter based on a predetermined angle when the calculated angle data is outside a predetermined range;

second predetermined process includes setting the first parameter to a border angle of the predetermined range or a predetermined angle outside the predetermined range; and the first threshold value is larger than a maximum value of a component of the first direction of the gravitational acceleration at an angle of the input device with respect to a gravity direction, the angle being included in the predetermined range.

19. A storage medium according to claim 15, wherein: the first setting processing calculates the first parameter based on a second predetermined value when a value calculated by the predetermined calculation processing based on the first acceleration data and the second acceleration data is outside a predetermined range; and wherein the predetermined value is a border value of the predetermined range or a value outside the predetermined range.

20. The medium of claim 1 wherein the game program further causes the computer to execute:

calculating a total number of frames to animate a virtual object for the game process, the total number of frames based on a value derived from the second acceleration data and an inclination angle of the input device.

21. The medium of claim 1 wherein the game program further causes the computer to execute:

calculating the first parameter as an angle of rotation of a virtual object based on a trigonometric function of the first acceleration data and the second acceleration data, wherein the game processing includes animating the virtual object based on the calculated angle.

22. A non-transitory storage medium having stored thereon a game program executable by a computer of a game apparatus capable of using a value detected by an acceleration sensor disposed in an input device, the acceleration sensor configured to detect accelerations in at least two directions, wherein:

the game instructs a player to perform an operation of inclining the input device; and the game program causes the computer to execute:

when the player performs the operation of inclining the input device, obtaining first acceleration data representing an acceleration in a direction perpendicularly crossing an arc which is a trajectory of a movement of a predetermined position in the input device made by the operation, based on a value detected by the acceleration sensor;

obtaining second acceleration data representing an acceleration in a tangent direction to the arc when the player performs the operation of inclining the input device, based on a value detected by the acceleration sensor;

executing a first mode when the first acceleration data is smaller than a first threshold value and a second mode otherwise;

when the first mode is executed, using the first acceleration data and the second acceleration data to calculate inclination data representing an inclination of the input device with respect to a gravity direction and to set the inclination data as a first parameter used in a computer game process;

when the second mode is executed, setting the first parameter to a predetermined value; and executing the computer game process based on the first parameter, the game process including animating a movement of a virtual object.

23. A non-transitory storage medium having stored thereon a game program executable by a computer of a game apparatus capable of using a value detected by an acceleration sensor provided in an input device for detecting accelerations in at least two directions, the game program causing the computer to execute:

obtaining first acceleration data representing an acceleration applied in a first direction of the input device;

obtaining second acceleration data representing an acceleration applied in a second direction of the input device which is different from the first direction;

storing a history of the obtained second acceleration data on a storage medium accessible by the computer;

determining whether or not the first acceleration data is smaller than a first threshold value;

referring to the history stored on the storage medium to at least determine whether or not maximum data of the second acceleration data in an immediately previous predetermined period is larger than a second threshold value; and executing predetermined game processing when the first acceleration data is determined to be larger than the first threshold value and additionally when the maximum data is determined to be larger than the second threshold value, the predetermined game processing including animating a movement of a virtual object at a predetermined speed, the predetermined speed independent of the first and second acceleration data.

24. A game apparatus configured to use a value detected by an acceleration sensor provided in an input device that is configured to detect accelerations in at least two directions, the game apparatus comprising:

a processing system configured to cause:

obtaining first acceleration data representing an acceleration applied in a first direction of the input device;

obtaining second acceleration data representing an acceleration applied in a second direction of the input device which is different from the first direction;

determining whether or not the first acceleration data is smaller than a first threshold value;

when the first acceleration data is determined to be smaller than the first threshold value, executing predetermined calculation processing at least based on the second acceleration data to execute first setting processing of calculating a first parameter used in game processing, wherein the first parameter is an inclination angle;

when the first acceleration data is determined to be larger than the first threshold value, executing second setting processing of setting the first parameter to a predetermined value; and executing the game processing by animating a movement of a virtual object based on the first parameter.

25. A game apparatus capable of using a value detected by an acceleration detection section provided in an input device for detecting an acceleration in at least two directions, wherein:

a game executable by the game apparatus instructs a player to perform an operation of inclining the input device; and the game apparatus comprises:

a processing system configured to cause:

when the player performs the operation of inclining the input device, obtaining first acceleration data representing an acceleration applied in a direction perpendicularly crossing an arc which is a trajectory of a movement of a predetermined position in the input device made by the operation;

obtaining second acceleration data representing an acceleration applied in a tangent direction to the arc when the player performs the operation of inclining the input device;

determining whether or not the first acceleration data is smaller than a first threshold value;

when the first acceleration data is determined to be smaller than the first threshold value, substituting the first acceleration data and the second acceleration data for an inverse tangent function to calculate inclination data representing an inclination of the input device with respect to a gravity direction and to set the inclination data as a first parameter used in game processing; and when the first acceleration data is determined to be larger than the first threshold, setting the first parameter to a predetermined inclination value; and executing the game processing based on the first parameter by animating a movement of a virtual game object.

26. A game apparatus capable of using a value detected by an acceleration detection section provided in an input device for detecting an acceleration in at least two directions, the game apparatus comprising:

a processing system configured to cause:

obtaining first acceleration data representing an acceleration applied in a first direction of the input device, based on a value detected by the acceleration detection section;

obtaining second acceleration data representing an acceleration applied in a second direction of the input device which is different from the first direction, based on a value detected by the acceleration detection section;

storing a history of the obtained second acceleration data on a non-transitory storage medium;

determining whether or not the first acceleration data is smaller than a first threshold value;

referring to the history stored on the non-transitory storage medium to at least determine whether or not maximum data of the second acceleration data in an immediately previous predetermined period is larger than the second threshold value; and executing predetermined game processing when the first acceleration data is determined to be larger than the first threshold value and further the maximum data is determined to be larger than the second threshold value, the predetermined game processing including animating a movement of a virtual object at a predetermined speed, the predetermined speed independent of the first and second acceleration data.

27. A computer implemented method for controlling an object of a computer program with a user input device, the user input device including an acceleration sensing system, the acceleration sensing system including one or more acceleration sensors, the acceleration sensing system configured to detect accelerations in at least two directions, the method comprising:

obtaining first acceleration data representing an acceleration in a first direction of the user input device;

obtaining second acceleration data representing an acceleration in a second direction of the user input device, the second direction different from the first direction;

executing a first mode when the first acceleration data is less than a predetermined threshold and otherwise executing a second mode;

when executing the first mode, executing a first predetermined process, the first predetermined process including calculating angle data from the second acceleration data, the angle data associated with a movement of the user input device;

when executing the second mode, executing a second predetermined process, the second predetermined process including calculating the angle data based on a predetermined inclination value; and animating a rotation of the object of the computer program based on the calculated angle data.

28. A game system configured to communicate with an acceleration sensing system disposed on or in an input device, the acceleration sensing system including one or more acceleration sensors, the acceleration sensing system configured to detect accelerations in at least two directions, the game system comprising:

a processing system configured to cause:

obtaining first acceleration data representing an acceleration in a first direction of the user input device;

obtaining second acceleration data representing an acceleration in a second direction of the user input device, the second direction different from the first direction;

executing a first mode when the first acceleration data is less than a predetermined threshold and otherwise executing a second mode;

when executing the first mode, executing a first predetermined process, the first predetermined process including calculating an orientation from the second acceleration data;

when executing the second mode, executing a second predetermined process, the second predetermined process including calculating the orientation from a predetermined orientation value; and animating a movement of an object of a computer program based on the calculated orientation.

* * * * *